United States Patent
Saizen et al.

(10) Patent No.: US 11,168,656 B2
(45) Date of Patent: Nov. 9, 2021

(54) FUEL INJECTION VALVE AND METHOD FOR MANUFACTURING FUEL INJECTION VALVE

(71) Applicant: DENSO CORPORATION, Kariya (JP)

(72) Inventors: Makoto Saizen, Kariya (JP); Shuichi Matsumoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 136 days.

(21) Appl. No.: 16/539,321

(22) Filed: Aug. 13, 2019

(65) Prior Publication Data
US 2019/0368453 A1    Dec. 5, 2019

Related U.S. Application Data

(63) Continuation of application No. PCT/JP2018/005449, filed on Feb. 16, 2018.

(30) Foreign Application Priority Data

Mar. 3, 2017    (JP) .............................. JP2017-040730

(51) Int. Cl.
*F02M 51/06*    (2006.01)
*B05B 1/30*    (2006.01)
(Continued)

(52) U.S. Cl.
CPC ....... *F02M 51/0685* (2013.01); *B05B 1/3053* (2013.01); *B23P 15/001* (2013.01);
(Continued)

(58) Field of Classification Search
CPC ............. F02M 51/0685; F02M 51/061; F02M 2200/08; F02M 2200/8084; B05B 1/3053
(Continued)

(56) References Cited

U.S. PATENT DOCUMENTS 6,032,879 A    3/2000    Hamada et al.
2005/0006492 A1*    1/2005    Brooks .................. F02M 61/18
239/5

FOREIGN PATENT DOCUMENTS

DE    10 2015 208 103    11/2016
WO    2018/159325    9/2018
WO    2018/159326    9/2018

OTHER PUBLICATIONS

U.S. Appl. No. 16/539,292 to Imai, filed Aug. 13, 2019 (68 pages).
(Continued)

*Primary Examiner* — Chee-Chong Lee
*Assistant Examiner* — Kevin Edward Schwartz
(74) *Attorney, Agent, or Firm* — Nixon & Vanderhye P.C.

(57) ABSTRACT

A fuel injection valve includes: a coil that is configured to generate a magnetic flux when the coil is energized; a stationary core that is configured to become a passage of the magnetic flux; a movable core that is configured to be attracted to the stationary core when the movable core becomes a passage of the magnetic flux; and a magnetic-flux limiting portion that is displaced from the stationary core in an axial direction while a degree of magnetism of the magnetic-flux limiting portion is lower than a degree of magnetism of the stationary core. A boundary between the stationary core and the magnetic-flux limiting portion is defined as a limiting boundary, and an imaginary extension line, which is formed by extending the limiting boundary toward the movable core, is defined as a boundary extension line. The limiting boundary is tilted relative to the axial direction.

12 Claims, 12 Drawing Sheets

(51) Int. Cl.
  *B23P 15/00* (2006.01)
  *F02M 61/16* (2006.01)
  *B23K 101/00* (2006.01)

(52) U.S. Cl.
  CPC ........ *F02M 51/061* (2013.01); *F02M 61/168* (2013.01); *B23K 2101/003* (2018.08); *F02M 2200/08* (2013.01); *F02M 2200/8084* (2013.01)

(58) Field of Classification Search
  USPC ..................................................... 239/585.5
  See application file for complete search history.

(56) References Cited

OTHER PUBLICATIONS

U.S. Appl. No. 16/539,223 to Saizen, et al., filed Aug. 13, 2019 (59 pages).

* cited by examiner

US 11,168,656 B2

FUEL INJECTION VALVE AND METHOD FOR MANUFACTURING FUEL INJECTION VALVE

CROSS REFERENCE TO RELATED APPLICATIONS

This application is a continuation application of International Patent Application No. PCT/JP2018/005449 filed on Feb. 16, 2018, which designated the U.S. and claims the benefit of priority from Japanese Patent Application No. 2017-40730 filed on Mar. 3, 2017. The entire disclosures of all of the above applications are incorporated herein by reference.

TECHNICAL FIELD

The present disclosure relates to a fuel injection valve and a method for manufacturing the fuel injection valve.

BACKGROUND

A previously proposed fuel injection valve includes: a valve housing, which functions as a yoke and receives a valve element; a coil, which generates a magnetic flux when the coil is energized; and a stationary core and a movable core, which form a passage of the magnetic flux. In this fuel injection valve, when the magnetic flux flows through the movable core and the valve housing, an attractive force is generated between the stationary core and the movable core to attract the movable core along with the valve element toward the stationary core, so that the valve element opens an injection hole to inject fuel.

SUMMARY

According to the present disclosure, there is provided a fuel injection valve configured to inject fuel from an injection hole. The fuel injection valve includes a coil, a stationary core, a movable core and a magnetic-flux limiting portion. The coil is configured to generate a magnetic flux when the coil is energized. The stationary core is configured to become a passage of the magnetic flux. The movable core is configured to be attracted to the stationary core when the movable core becomes a passage of the magnetic flux. The magnetic-flux limiting portion is displaced from the stationary core in an axial direction of a central axis of the stationary core. The magnetic-flux limiting portion is a metal member that has a degree of magnetism, which is lower than a degree of magnetism of the stationary core. A boundary between the stationary core and the magnetic-flux limiting portion is defined as a limiting boundary, and an imaginary extension line, which is formed by extending the limiting boundary toward the movable core, is defined as a boundary extension line. The limiting boundary is tilted relative to the axial direction of the central axis such that the boundary extension line is progressively spaced away from the central axis in a direction away from the injection hole.

BRIEF DESCRIPTION OF DRAWINGS

The present disclosure, together with additional objectives, features and advantages thereof, will be best understood from the following description in view of the accompanying drawings.

DETAILED DESCRIPTION

Figure 1:
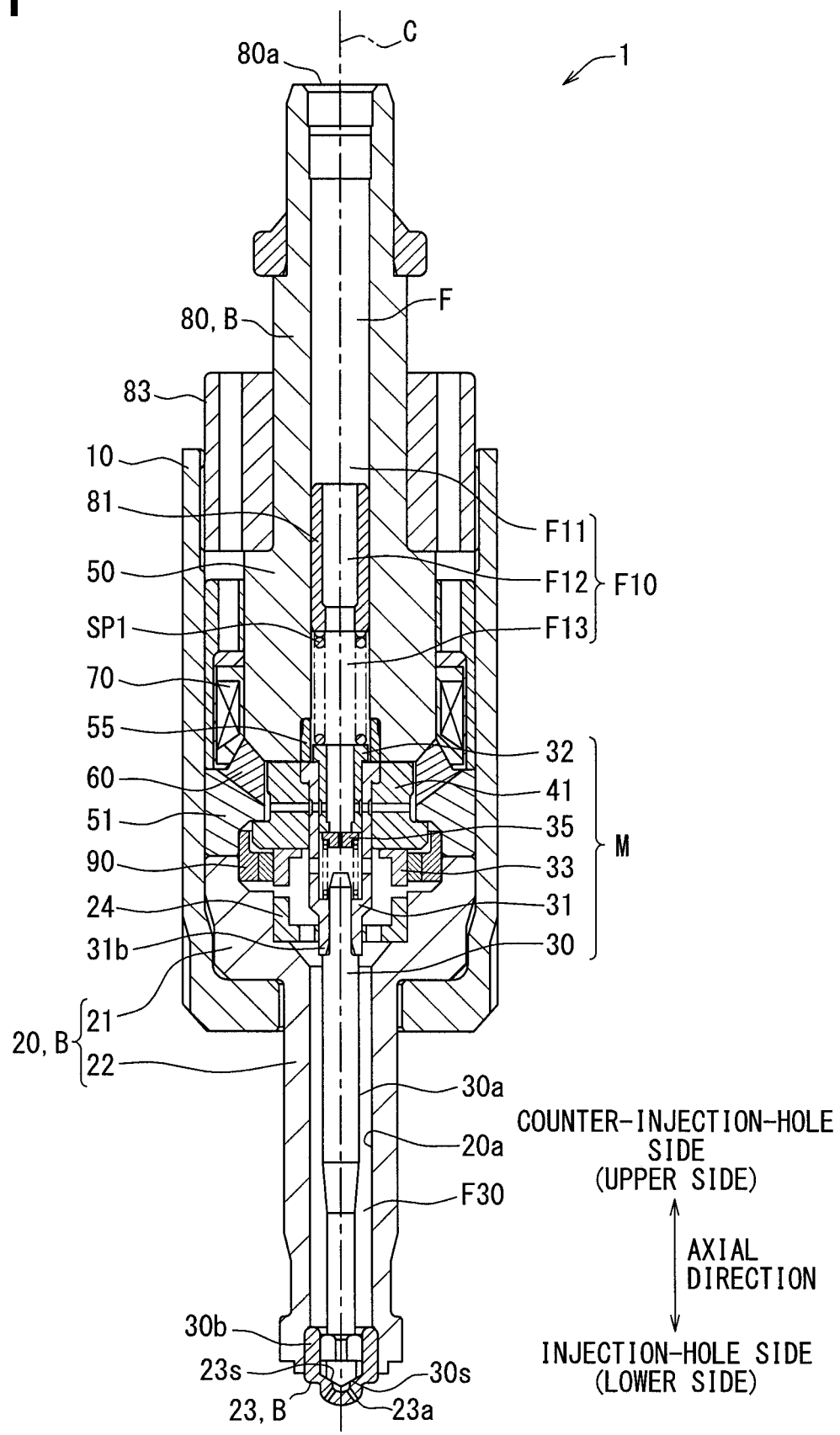
FIG. 1 is a cross-sectional view of a fuel injection valve according to a first embodiment.

As a fuel injection valve, which injects fuel from an injection hole, for example, there has been proposed a fuel injection valve that includes: a valve housing, which functions as a yoke and receives a valve element; a coil, which generates a magnetic flux when the coil is energized; and a stationary core and a movable core, which form a passage of the magnetic flux. In this fuel injection valve, when the magnetic flux flows through the movable core and the valve housing, an attractive force is generated between the stationary core and the movable core. This fuel injection valve further includes a seal ring that is a non-magnetic member. The seal ring is placed between the stationary core and the valve housing in the axial direction of the coil, so that the seal ring limits short circuiting of the magnetic flux between the stationary core and the valve housing without passing through the movable core. A boundary between the seal ring and the stationary core includes a portion that extends in a direction generally perpendicular to the axial direction of the coil. Furthermore, a flow passage, which conducts the fuel to the injection hole, is formed on a radially inner side of the seal ring and the stationary core.

However, in the above-described structure, when a fuel pressure in the flow passage becomes high, the seal ring and the stationary core may possibly be separated from each other in the axial direction of the coil, or the fuel may possibly leak to the outside through the location between the seal ring and the stationary core. Specifically, there is a possibility that the fuel is not appropriately injected from the fuel injection valve.

In view of the above point, it is conceivable to weld between the seal ring and the stationary core at the time of manufacturing the fuel injection valve. In the structure, in which the boundary between the seal ring and the stationary core has the portion that extends in the direction generally perpendicular to the axial direction of the coil, the application of the heat from the radially inner side for the welding may become difficult due to a small size of an inside space located at the inside of the seal ring and the stationary core. In this case, the heat needs to be applied from the radially outer side. Therefore, depending on a length of the boundary between the seal ring and the stationary core in the radial direction, the welding may not be appropriately performed at a radially inner end portion of the boundary. Specifically, the fixation strength for fixing between the seal ring and the stationary core may become insufficient, and thereby there is a possibility of occurrence of separation between the seal ring and the stationary core and/or leakage of the fuel.

According to a first aspect of the present disclosure, there is provided a fuel injection valve configured to inject fuel from an injection hole, including: a coil that is configured to generate a magnetic flux when the coil is energized; a stationary core that is configured to become a passage of the magnetic flux; a movable core that is configured to be attracted to the stationary core when the movable core becomes a passage of the magnetic flux; and a magnetic-flux limiting portion that is displaced from the stationary core in an axial direction while a degree of magnetism of the magnetic-flux limiting portion is lower than a degree of magnetism of the stationary core, wherein: a boundary between the stationary core and the magnetic-flux limiting portion is defined as a limiting boundary, and an imaginary extension line, which is formed by extending the limiting boundary toward the movable core, is defined as a boundary extension line; and the limiting boundary is tilted relative to the axial direction such that the boundary extension line passes on an injection hole side of all of the stationary core and the magnetic-flux limiting portion where the injection hole is placed.

According to the first aspect, since the stationary core and the magnetic-flux limiting portion are displaced from each other in the axial direction, the stationary core and the magnetic-flux limiting portion can be joined together by welding. Therefore, separation between the stationary core and the magnetic-flux limiting portion in the axial direction of the coil and leakage of the fuel to the outside through a location between the stationary core and the magnetic-flux limiting portion can be limited.

Here, when the fuel pressure at the fuel injection valve becomes high, it is required to increase a welding surface area to withstand the fuel pressure, and it is conceivable to use a method for welding the stationary core and the magnetic-flux limiting portion along an entire extent of the limiting boundary in the radial direction of the coil. In order to further increase the welding surface area, it is conceivable to further increase a length of the limiting boundary in the radial direction of the coil. However, in such a case, there is a possibility that the welding cannot be appropriately performed to an inner end part of the limiting boundary just by applying the heat from a radially outer side of the limiting boundary.

In contrast, according to the first aspect, the extension line of the limiting boundary does not intersect with any one of the stationary core and the magnetic-flux limiting portion, so that the heat for the welding can be applied to the limiting boundary from the radially outer side, and the application of the heat from the radially inner side can be eased.

According to a second aspect of the present disclosure, there is provided a method for manufacturing a fuel injection valve that includes: an injection hole that is configured to inject fuel; a coil that is configured to generate a magnetic flux when the coil is energized; a stationary core that is configured to become a passage of the magnetic flux; a movable core that is configured to be attracted to the stationary core when the movable core becomes a passage of the magnetic flux; and a magnetic-flux limiting portion that is displaced from the stationary core in an axial direction while a degree of magnetism of the magnetic-flux limiting portion is lower than a degree of magnetism of the stationary core, wherein: a boundary between the stationary core and the magnetic-flux limiting portion is defined as a limiting boundary, and an imaginary extension line, which is formed by extending the limiting boundary toward the movable core, is defined as a boundary extension line; and the limiting boundary is tilted relative to the axial direction such that the boundary extension line passes on an injection hole side of all of the stationary core and the magnetic-flux limiting portion where the injection hole is placed, the method includes: applying heat to the limiting boundary from each of a radially outer side and a radially inner side of the limiting boundary to weld the stationary core and the magnetic-flux limiting portion together.

According to the second aspect, the advantages, which are similar to those of the first embodiment, can be achieved.

Hereinafter, embodiments of the present disclosure will be described with reference to the drawings. In the following respective embodiments, corresponding structural elements are indicated by the same reference signs and may not be redundantly described in some cases. In a case where only a part of a structure is described in each of the following embodiments, the rest of the structure of the embodiment may be the same as that of previously described one or more of the embodiments. Besides the explicitly described combination(s) of structural components in each of the following embodiments, the structural components of different embodiments may be partially combined even though such a combination(s) is not explicitly explained as long as there is no problem. It should be understood that the unexplained combinations of the structural components recited in the following embodiments and modifications thereof are assumed to be disclosed in this description by the following explanation.

First Embodiment

A fuel injection valve 1 shown in FIG. 1 is installed to a gasoline engine (serving as an ignition internal combustion engine) and directly injects fuel into a corresponding combustion chamber of the engine that is a multi-cylinder type. The fuel to be supplied to the fuel injection valve 1 is pumped by a fuel pump (not shown) that is driven by a rotational drive force of the engine. The fuel injection valve 1 includes a case 10, a nozzle body 20, a valve element 30, a movable core 41, stationary cores 50, 51, a non-magnetic member 60, a coil 70 and a pipe connecting portion 80.

The case 10 is made of metal and is shaped into a cylindrical tubular form that extends in an axial direction of a coil axis C, which is a center line of the coil 70. The coil axis C of the coil 70 coincides with a central axis of the case 10, the nozzle body 20, the valve element 30, the movable core 41, the stationary cores 50, 51 and the non-magnetic member 60. The direction of the axis corresponds to the axial direction.

The nozzle body 20 is made of metal and includes: a body main portion 21 that is inserted into and is engaged with the case 10; and a nozzle portion 22 that extends from the body main portion 21 to the outside of the case 10. The body main portion 21 and the nozzle portion 22 are respectively shaped into a cylindrical tubular form that extends in the axial direction. An injection hole member 23 is installed to a distal end of the nozzle portion 22.

The injection hole member 23 is made of metal and is securely welded to the nozzle portion 22. The injection hole member 23 is a bottomed cylindrical tubular form that extends in the axial direction. An injection hole 23a, which injects the fuel, is formed at a distal end of the injection hole member 23. A seatable surface 23s is formed at an inner peripheral surface of the injection hole member 23, and the valve element 30 can be lifted from and seated against the seatable surface 23s.

The valve element 30 is made of metal and is shaped into a cylindrical columnar form that extends in the axial direction. The valve element 30 is installed in an inside of the nozzle body 20 in a state where the valve element 30 is movable in the axial direction. A flow passage, which is in an annular form and extends in the axial direction, is formed between an outer peripheral surface 30a of the valve element 30 and an inner peripheral surface 20a of the nozzle body 20. This flow passage will be referred to as a downstream flow passage F30. A seat surface 30s is formed at an end portion of the valve element 30 located on the injection hole 23a side, and the seat surface 30s is in a ring form and can be seated against and lifted away from the seatable surface 23s.

A coupling member 31 is joined to a counter-injection-hole side end portion of the valve element 30, which is opposite to the injection hole 23a, by for example, welding. Furthermore, an orifice member 32 and the movable core 41 are installed to a counter-injection-hole side end part of the coupling member 31.

Figure 2:
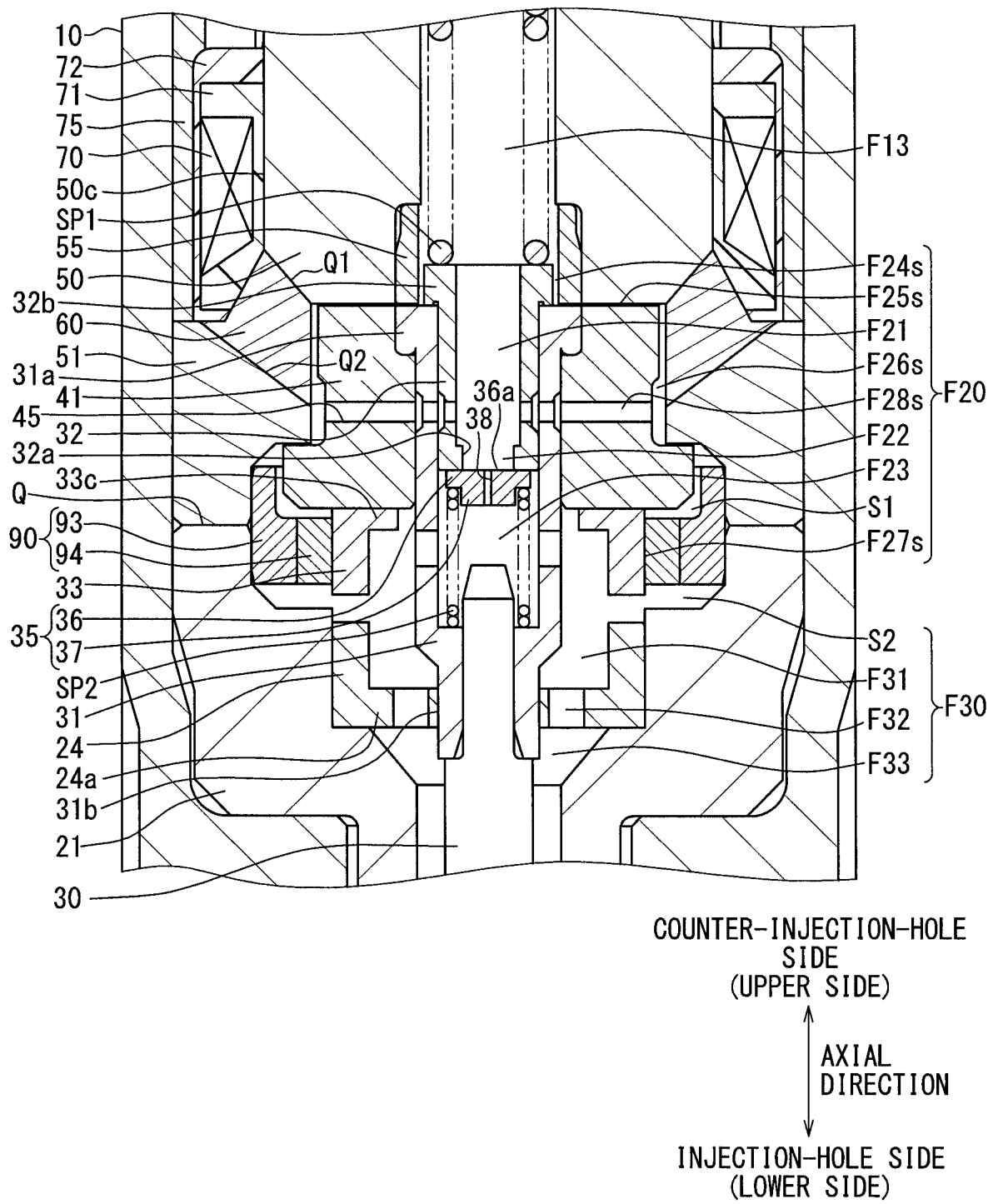
FIG. 2 is an enlarged view showing an area around a movable core shown in FIG. 1.
Figure 3:
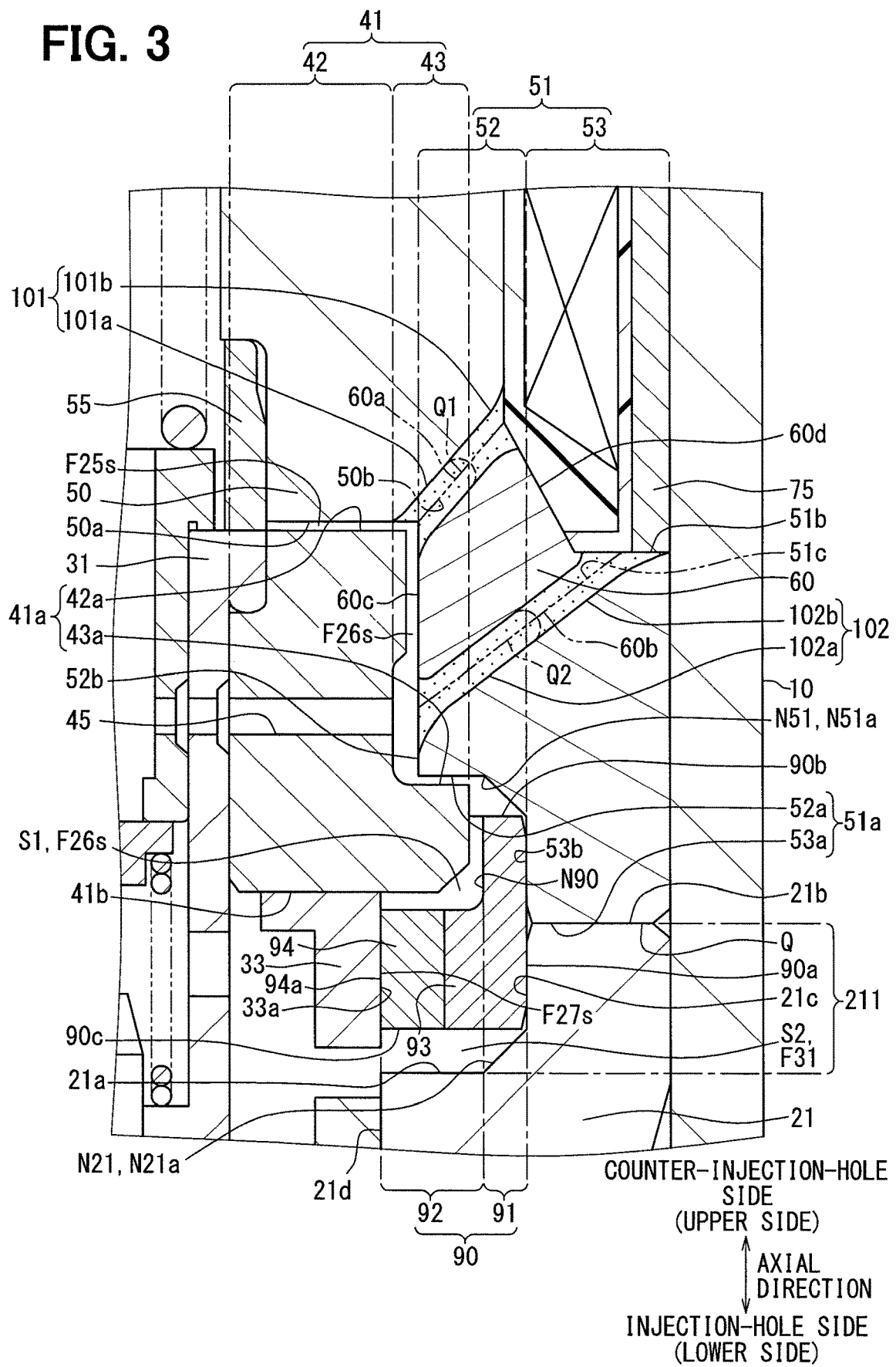
FIG. 3 is an enlarged view of an area around a first welding portion and a second welding portion shown in FIG. 1.

As shown in FIGS. 2 and 3, the coupling member 31 is shaped into a cylindrical tubular form and extends in the axial direction while an inside of the coupling member 31 serves as a flow passage F23 that conducts the fuel. The orifice member 32 is fixed to a cylindrical inner peripheral surface of the coupling member 31 by, for example, welding. The movable core 41 is fixed to a cylindrical outer peripheral surface of the coupling member 31 by, for example, welding. An enlarged diameter portion 31a, a diameter of which is increased in the radial direction, is formed at the counter-injection-hole side end part of the coupling member 31. An injection-hole-side end surface of the enlarged diameter portion 31a is engaged with the movable core 41, so that removal of the coupling member 31 from the movable core 41 toward the injection-hole side is limited.

The orifice member 32 is shaped into a cylindrical tubular form and extends in the axial direction while an inside of the orifice member 32 serves as a flow passage F21 that conducts the fuel. An orifice 32a is formed at an injection-hole-side end part of the orifice member 32. A passage cross-sectional area of a portion of the flow passage F21 at the orifice 32a is partially narrowed, so that the orifice 32a serves as a flow restricting portion that restricts a flow rate of the fuel. The portion of the flow passage F21, at which the passage cross-sectional area is narrowed by the orifice 32a, is referred to as a restricting flow passage F22.

The restricting flow passage F22 is located along a central axis of the valve element 30. A passage length of the restricting flow passage F22 is smaller than a diameter of the restricting flow passage F22. An enlarged diameter portion 32b, which is enlarged in the radial direction, is formed at the counter-injection-hole side end part of the orifice member 32. An injection-hole-side end surface of the enlarged diameter portion 32b is engaged with the coupling member 31, so that removal of the orifice member 32 from the coupling member 31 toward the injection-hole side is limited.

The movable structure M includes a movable member 35 and a resilient urging member SP2. The movable member 35 is placed in the flow passage F23 at the inside of the coupling member 31 such that the movable member 35 is movable in the axial direction relative to the orifice member 32.

The movable member 35 is shaped into a cylindrical columnar form extending in the axial direction and is made of metal, and the movable member 35 is placed on the downstream side of the orifice member 32. A through-hole extends through a center part of the movable member 35 in the axial direction. This through-hole is a portion of the flow passage F and is communicated with the restricting flow passage F22, and this through-hole serves as a sub-restricting passage 38 that has a passage cross-sectional area, which is smaller than the passage cross-sectional area of the restricting flow passage F22. The movable member 35 includes a seal portion 36 and an engaging portion 37. The seal portion 36 has a seal surface 36a that is configured to cover the restricting flow passage F22. The engaging portion 37 is engaged with the resilient urging member SP2.

A diameter of the engaging portion 37 is smaller than a diameter of the seal portion 36, and a resilient urging member SP2, which is shaped in a form of a coil, is fitted to the engaging portion 37. In this way, movement of the resilient urging member SP2 in the radial direction is limited by the engaging portion 37. One end of the resilient urging member SP2 is supported by a lower end surface of the seal portion 36, and the other end of the resilient urging member SP2 is supported by the coupling member 31. The resilient urging member SP2 is resiliently deformed in the axial direction to apply a resilient force against the movable member 35, and the seal surface 36a of the movable member 35 is urged against the lower end surface of the orifice member 32 by the resilient force of the resilient urging member SP2.

The movable core 41 is an annular member made of metal. The movable core 41 includes a movable inside 42 and a movable outside 43, which are respectively shaped into an annular form. The movable inside 42 forms an inner peripheral surface of the movable core 41, and the movable outside 43 is placed on the radially outer side of the movable inside 42. The movable core 41 includes a movable upper surface 41a that faces the counter-injection-hole side and is formed at an upper end surface of the movable core 41. A step is formed at the movable upper surface 41a. Specifically, the movable outside 43 has a movable outside upper surface 43a that faces the counter-injection-hole side, and the movable inside 42 has a movable inside upper surface 42a that faces the counter-injection-hole side. The movable outside upper surface 43a is placed on the injection-hole side of the movable inside upper surface 42a, so that the step is formed at the movable upper surface 41a. The movable inside upper surface 42a and the movable outside upper surface 43a extend perpendicular to the axial direction.

The movable core 41 has a movable lower surface 41b that faces the injection-hole side. The movable lower surface 41b extends over the movable inside 42 and the movable outside 43 in the radial direction and thereby forms a planar lower end surface of the movable core 41. At the movable lower surface 41b, there is no step at a boundary between the movable inside 42 and the movable outside 43. In the axial direction, a height of the movable outside 43 is smaller than a height of the movable inside 42, and thereby the movable core 41 is shaped such that the movable outside 43 projects from the movable inside 42 toward the radially outer side.

The movable core 41 is movable integrally with the coupling member 31, the valve element 30, the orifice member 32 and a slide member 33 in the axial direction. The movable core 41, the coupling member 31, the valve element 30, the orifice member 32 and the slide member 33 collectively serve as a movable structure M that is configured to move integrally in the axial direction.

The slide member 33 is formed separately from the movable core 41 but is fixed to the movable core 41 by, for example, welding. By making the slide member 33 separately from the movable core 41, it is possible to easily realize a structure, in which the slide member 33 and the movable core 41 are made of different materials, respectively. A material of the movable core 41 has a higher degree of magnetism in comparison to a material of the slide member 33, and the material of the slide member 33 has higher wear resistance in comparison to the material of the movable core 41.

The slide member 33 is shaped into a cylindrical tubular form, and a cylindrical outer peripheral surface of the slide member 33 serves as a slide surface 33a that is slidable relative to a member at the nozzle body 20 side. A counter-injection-hole side surface of the slide member 33 is joined to an injection-hole-side surface of the movable core 41 by, for example, welding such that the fuel does not pass through a gap between the slide member 33 and the movable core 41. A reduced diameter portion 33c, a diameter of which is reduced in the radial direction, is formed at a counter-injection-hole side end part of the slide member 33. A support member 24 is fixed to the body main portion 21, and a reduced diameter portion 24a, a diameter of which is reduced in the radial direction, is formed at the support member 24. The slide member 33 and the support member 24 are arranged one after the other in the axial direction. A separation distance between the slide member 33 and the support member 24 is increased or decreased in response to movement of the movable structure M. This separation distance is minimized in a valve closing state of the valve element 30, in which the valve element 30 closes the injection hole. However, even in this state, the slide member 33 is spaced from the support member 24 toward the counter-injection-hole side.

The movable structure M includes guide portions that enable slide movement of the movable structure M along the nozzle body 20 in the axial direction and support the movable structure M relative to the nozzle body 20 in the radial direction. The guide portions are provided at two axial locations, respectively. One of the guide portions, which is located on the injection hole 23a side in the axial direction, is referred to as an injection-hole-side guide portion 30b (see FIG. 1), and the other one of the guide portions, which is located on the counter-injection-hole side, is referred to as a counter-injection-hole-side guide portion 31b. The injection-hole-side guide portion 30b is formed at an outer peripheral surface of the valve element 30 and is slidably supported by an inner peripheral surface of the injection hole member 23. The counter-injection-hole-side guide portion 31b is formed at an outer peripheral surface of the coupling member 31 and is slidably supported by an inner peripheral surface of the support member 24.

The stationary cores 50, 51 are fixed in the inside of the case 10. The stationary cores 50, 51 are respectively shaped into a ring form that circumferentially extends about the axis, and the stationary cores 50, 51 are made of metal. The first stationary core 50 is placed on the radially inner side of the coil 70 such that an outer peripheral surface of the first stationary core 50 is opposed to an inner peripheral surface of the coil 70. The first stationary core 50 has a first lower surface 50a that faces the injection-hole side, and the first lower surface 50a forms a lower end surface of the first stationary core 50 and is perpendicular to the axial direction. The first stationary core 50 is placed on the counter-injection-hole side of the movable core 41, and the first lower surface 50a is opposed to the movable inside upper surface 42a of the movable core 41. The first stationary core 50 includes a first tilt surface 50b and a first outer surface 50c. The first tilt surface 50b obliquely extends from a radially outer end portion of the first lower surface 50a toward the counter-injection-hole side. The first outer surface 50c is an outer peripheral surface of the first stationary core 50 and extends from a counter-injection-hole side upper end portion of the first tilt surface 50b in the axial direction. The first stationary core 50 is shaped such that an outer corner between the first lower surface 50a and the first outer surface 50c is chambered to form the first tilt surface 50b.

The second stationary core 51 is placed on the injection-hole side of the coil 70 and is shaped into an annular form as a whole. The second stationary core 51 includes a second inside 52 and a second outside 53, which are respectively shaped into an annular form. The second outside 53 forms an outer peripheral surface of the second stationary core 51, and the second inside 52 is placed on the radially inner side of the second outside 53. The second stationary core 51 includes a second lower surface 51a, which faces the injection-hole side, and the second lower surface 51a forms a lower end surface of the second stationary core 51 and is perpendicular to the axial direction. A step is formed at the second lower surface 51a. Specifically, the second inside 52 has a second inside lower surface 52a that faces the injection-hole side, and the second outside 53 has a second outside lower surface 53a that faces the injection-hole side. The second inside lower surface 52a is placed on the counter-injection-hole side of the second outside lower surface 53a, so that the step is formed at the second lower surface 51a. In the axial direction, a height of the second inside 52 is smaller than a height of the second outside 53, and thereby the second stationary core 51 is shaped such that the second inside 52 projects from the second outside 53 toward the radially inner side.

The second inside 52 of the second stationary core 51 is placed on the counter-injection-hole side of the movable outside 43 of the movable core 41, and the second inside 52 and the movable outside 43 are placed one after the other in the axial direction. In this case, the second inside lower surface 52a and the movable outside upper surface 43a are opposed to each other in the axial direction.

At the second stationary core 51, the second outside 53 is placed on the counter-injection-hole side of the body main portion 21. The body main portion 21 includes an outside projection 211, which is shaped into an annular form and extends from the radially outer end portion of the body main portion 21 toward the counter-injection-hole side. The outside projection 211 is spaced from a radially inner end portion of the upper end surface of the body main portion 21, so that a step is formed at the upper end surface of the body main portion 21. The body main portion 21 includes a main portion inside upper surface 21a, a main portion outside upper surface 21b, a main portion outside inner surface 21c and a main portion inside inner surface 21d. The main portion inside upper surface 21a and the main portion outside upper surface 21b face the counter-injection-hole side, and the main portion outside inner surface 21c and the main portion inside inner surface 21d face the radially inner side. The main portion outside upper surface 21b is an upper end surface of the outside projection 211, and the main portion outside inner surface 21c is an inner peripheral surface of the outside projection 211. The main portion inside inner surface 21d extends from a radially inner end portion of the main portion inside upper surface 21a toward the injection-hole side and is an inner peripheral surface of the body main portion 21. The main portion inside upper surface 21a is a portion of the upper end surface of the body main portion 21, which is located on the radially inner side of the main portion outside inner surface 21c. The main portion inside upper surface 21a and the main portion outside upper surface 21b are perpendicular to the axial direction, and the main portion outside inner surface 21c extends in parallel with the axial direction.

At the second stationary core 51, the second outside lower surface 53a is overlapped with the main portion outside upper surface 21b, and the second stationary core 51 and the body main portion 21 are joined together by, for example, welding at this overlapped portion. In a state before the welding, the second outside lower surface 53a and the main portion outside upper surface 21b are included in a stationary boundary Q, which is a boundary between the second stationary core 51 and the body main portion 21. A width of the second outside lower surface 53a and a width of the main portion outside upper surface 21b, which are measured in the radial direction, are set to be equal to each other, and the second outside lower surface 53a and the main portion outside upper surface 21b are entirely overlapped with each other. An outer peripheral surface of the second outside 53 and an outer peripheral surface of the body main portion 21 are overlapped with the inner peripheral surface of the case 10.

The second stationary core 51 includes a second upper surface 51b and a second tilt surface 51c. The second tilt surface 51c obliquely extends from a second inside inner surface 52b, which is an inner peripheral surface of the second inside 52, toward the counter-injection-hole side, and the second upper surface 51b extends from an upper end portion of the second tilt surface 51c in the radial direction. In this case, the second upper surface 51b and the second tilt surface 51c form an upper end surface of the second stationary core 51. The second tilt surface 51c extends along both of the second inside 52 and the second outside 53 in the radial direction. The second stationary core 51 is shaped such that an outer corner between the second upper surface 51b and the second inside inner surface 52b is chambered to form the second tilt surface 51c.

The second stationary core 51 includes a second outer surface 51d. The second outer surface 51d is an outer peripheral surface of the second stationary core 51 and extends in the axial direction to connect between the second lower surface 51a and the second upper surface 51b. The second outer surface 51d extends in parallel with the coil axis C. An outer peripheral surface of the second outside 53 is formed by the second outer surface 51d.

The non-magnetic member 60 is a metal member that is shaped into a ring form and circumferentially extends about the axis, and the non-magnetic member 60 is placed between the first stationary core 50 and the second stationary core 51. A degree of magnetism of the non-magnetic member 60 is lower than a degree of magnetism of each stationary core 50, 51 and the degree of magnetism of the movable core 41 and is made of, for example, a non-magnetic material. Similar to the non-magnetic member 60, a degree of magnetism of the body main portion 21 is lower than the degree of magnetism of each stationary core 50, 51 and the degree of magnetism of the movable core 41, and the body main portion 21 is made of, for example, a non-magnetic material. In contrast, each of the stationary cores 50, 51 and the movable core 41 has the relatively high degree of magnetism and is made of, for example, a ferromagnetic material.

The non-magnetic member 60 corresponds to a magnetic-flux limiting portion that limits the magnetic flux to flow without passing through the movable core 41 and the stationary cores 50, 51. The non-magnetic member 60 may be also referred to as a short-circuit liming portion that limits occurrence of short-circuiting of the magnetic flux between the stationary cores 50, 51 without passing through the movable core 41. The stationary cores 50, 51 and the movable core 41 may be also referred to as a magnetic flux passage member that can easily become a passage of the magnetic flux. The body main portion 21 and the nozzle portion 22 are integrally formed in one piece from the metal at the nozzle body 20, so that the body main portion 21 and the nozzle portion 22 have the relatively low degree of magnetism.

The non-magnetic member 60 includes an upper tilt surface 60a and a lower tilt surface 60b. The upper tilt surface 60a faces the counter-injection-hole side in a state where the upper tilt surface 60a is tilted relative to the axial direction. The lower tilt surface 60b faces the injection-hole side in a state where the lower tilt surface 60b is tilted relative to the axial direction. At least a portion of the first tilt surface 50b and at least a portion of the second tilt surface 51c are arranged one after the other in the axial direction, and the non-magnetic member 60 is interposed between the tilt surfaces 50b, 51c at least in the axial direction.

Furthermore, the non-magnetic member 60 includes a non-magnetic inner surface 60c and a non-magnetic outer surface 60d. The non-magnetic inner surface 60c connects between a radially inner end portion of the upper tilt surface 60a and a radially inner end portion of the lower tilt surface 60b and faces the radially inner side, so that the non-magnetic inner surface 60c forms an inner peripheral surface of the non-magnetic member 60. The non-magnetic outer surface 60d connects between a radially outer end portion of the upper tilt surface 60a and a radially outer end portion of the lower tilt surface 60b and faces the radially outer side, so that the non-magnetic outer surface 60d forms an outer peripheral surface of the non-magnetic member 60.

As shown in FIG. 3, the upper tilt surface 60a is overlapped with the first tilt surface 50b of the first stationary core 50, and the upper tilt surface 60a and the first tilt surface 50b are joined together by welding (e.g., laser welding). In a state before the welding, the upper tilt surface 60a and the first tilt surface 50b are included in a first boundary Q1, which is a boundary between the first stationary core 50 and the non-magnetic member 60. Here, a welded portion, at which the first stationary core 50 and the non-magnetic member 60 are welded together, is referred to as a first welding portion 101. The first boundary Q1 is entirely included in the first welding portion 101. Two opposite end parts of the first boundary Q1 are included in the first welding portion 101. The first welding portion 101 is a solidified portion that is formed such that a portion of the first stationary core 50 and a portion of the non-magnetic member 60 are molten and mixed through the heating and are solidified through cooling to form the solidified portion.

The lower tilt surface 60b is overlapped with the second tilt surface 51c of the second stationary core 51, and the lower tilt surface 60b and the second tilt surface 51c are joined together by welding (e.g., laser welding). In the state before the welding, the lower tilt surface 60b and the second tilt surface 51c are included in a second boundary Q2, which is a boundary between the second stationary core 51 and the non-magnetic member 60. Here, a welded portion, at which the second stationary core 51 and the non-magnetic member 60 are welded together, is referred to as a second welding portion 102. The second boundary Q2 is entirely included in the second welding portion 102. Specifically, two opposite end parts of the second boundary Q2 are included in the second welding portion 102. The second welding portion 102 is placed on the injection-hole side of the first welding portion 101 in the axial direction. The second welding portion 102 is a solidified portion that is formed such that a portion of the second stationary core 51 and a portion of the non-magnetic member 60 are molten and mixed through the heating and are solidified through cooling to form the solidified portion.

The welding portions 101, 102 are indicated by halftone dots in FIG. 3, and the boundaries Q1, Q2 are indicated by an imaginary line in FIG. 3. In contrast, in FIG. 2 and the other drawings, which are other than FIG. 3, the indication of the welding portions 101, 102 is omitted for the sake of simplicity. However, in reality, as shown in FIG. 3, the portions of the stationary cores 50, 51, the portions of the non-magnetic member 60 and the boundaries Q1, Q2 are lost through the formation of the welding portions 101, 102.

Figure 4:
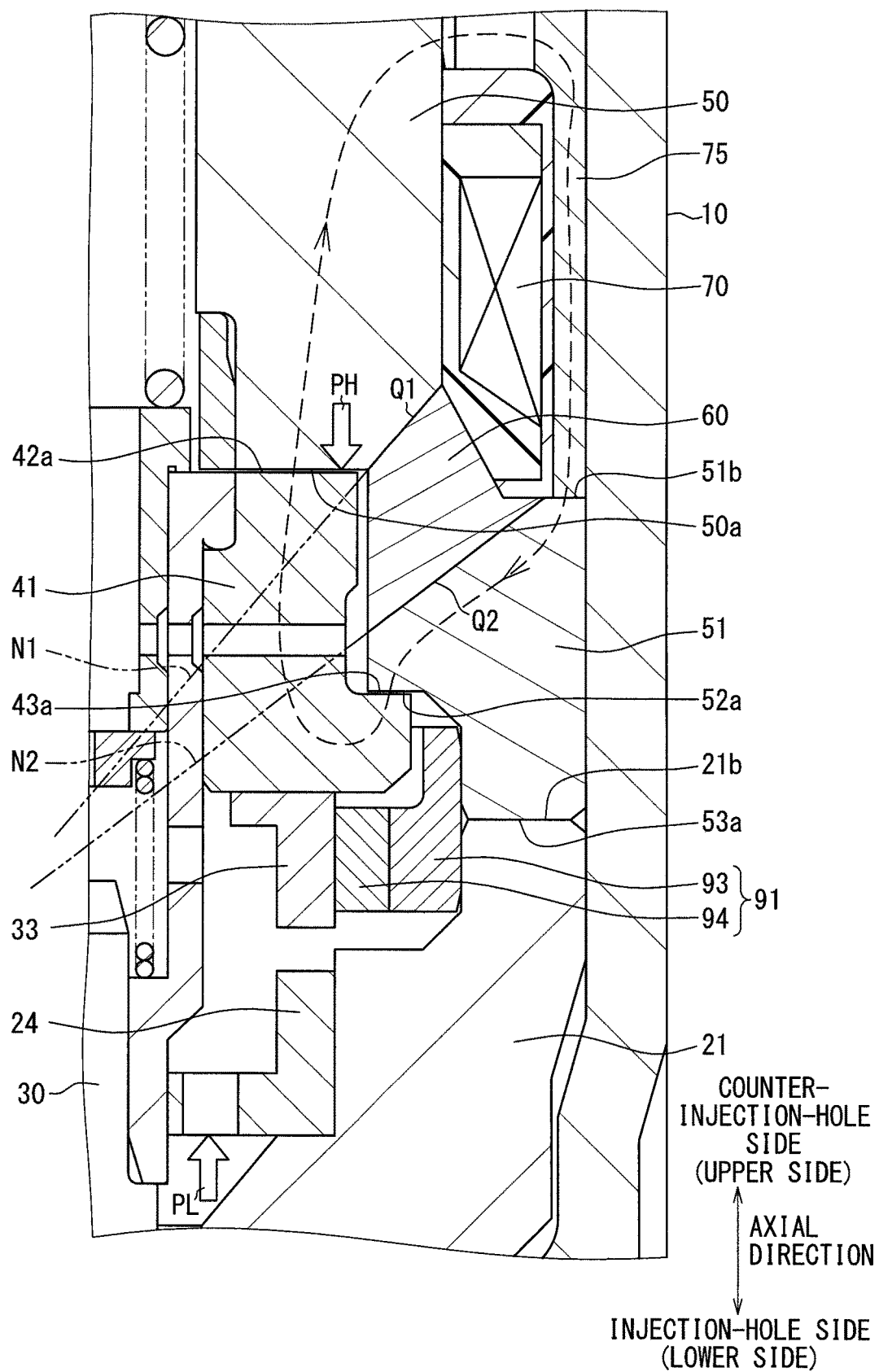
FIG. 4 is a diagram for describing extension lines of boundaries.
Figure 5:
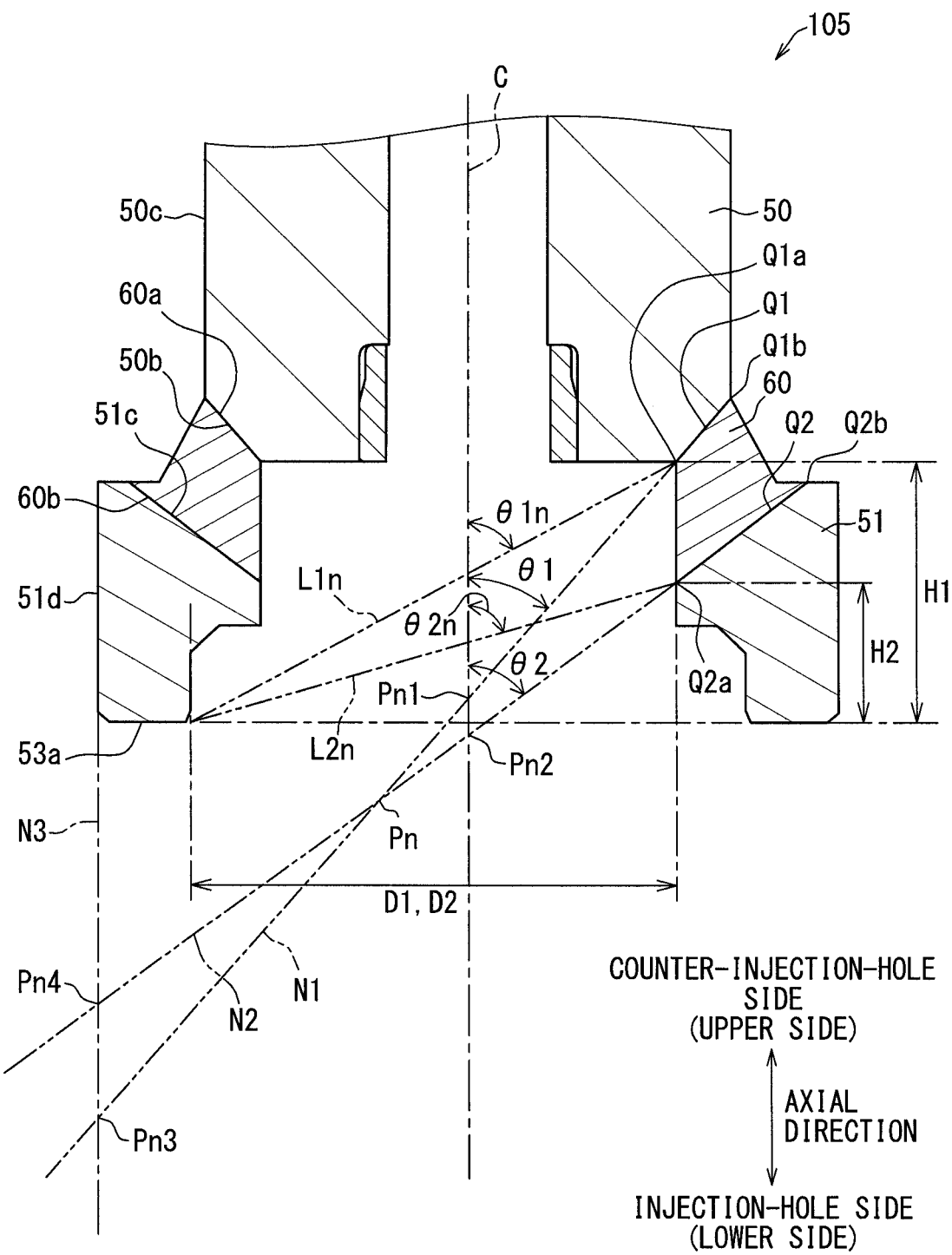
FIG. 5 is a diagram for describing a core unit.

As shown in FIGS. 4 and 5, the first boundary Q1 and the second boundary Q2 linearly extend in a state where the first boundary Q1 and the second boundary Q2 are tilted relative to the coil axis C. An imaginary extension line, which is formed by extending the first boundary Q1 toward the coil axis C side and the opposite side, is referred to as a first extension line N1. In such a case, a first angle $\theta 1$, which is an angle defined between the first extension line N1 and the coil axis C, is smaller than 90 degrees. An imaginary extension line, which is formed by extending the second boundary Q2 toward the coil axis C side and the opposite side, is referred to as a second extension line N2. In such a case, a second angle $\theta 2$, which is an angle defined between the second extension line N2 and the coil axis C, is also smaller than 90 degrees. The first angle $\theta 1$ is smaller than the second angle $\theta 2$, and the first extension line N1 and the second extension line N2 intersect with each other at an intersection point Pn.

The first boundary Q1 and the second boundary Q2 respectively serve as a limiting boundary. The first extension line N1 and the second extension line N2 respectively serve as a boundary extension line. The first angle $\theta 1$ and the second angle $\theta 2$ respectively serve as a tilt angle. A length of the second boundary Q2, which is measured in an extending direction of the second extension line N2, is larger than a length of the first boundary Q1, which is measured in the extending direction of the first extension line N1. An extent of the second boundary Q2, which is measured in a radial direction that is perpendicular to the coil axis C, is also larger than an extent of the first boundary Q1, which is measured in the radial direction.

At an opposite side, which is diametrically opposite to proximal end portions of the extension lines N1, N2 about the coil axis C, the extension lines N1, N2 are located on the injection-hole side of all of the stationary cores 50, 51 and the non-magnetic member 60. That is, at a location, which is different from the boundary Q1, Q2, each extension line N1, N2 does not intersect with any of the stationary cores 50, 51 and the non-magnetic member 60.

Specifically, the first angle $\theta 1$ of the first extension line N1 is larger than a predetermined first reference angle $\theta 1n$. Here, an imaginary line, which connects between an injection-hole-side end part of the first boundary Q1 and an injection-hole-side end part of the second stationary core 51, is referred to as a first reference line L1n. An angle, which is defined between the first reference line L1n and the coil axis C, is referred to as the first reference angle $\theta 1n$. In the present embodiment, a separation distance, which is radially measured between an inner end part Q1a of the first boundary Q1 and an inner end part of the second outside lower surface 53a located on an opposite side of the coil axis C that is diametrically opposite to the inner end part Q1a of the first boundary Q1, is referred to as a separation distance D1. Furthermore, a separation distance, which is axially measured between the inner end part Q1a of the first boundary Q1 and the second outside lower surface 53a, is referred to as a separation distance H1. The first reference angle $\theta 1n$ is computed by using an equation of $\tan \theta 1n = H1/D1$, and the first angle $\theta 1$ is set to a value that satisfies a relationship of $\theta 1 > \theta 1n$. In this way, an upper limit value of the first angle $\theta 1$ is set.

Similarly, the second angle $\theta 2$ of the second extension line N2 is larger than a predetermined second reference angle $\theta 2n$. Here, an imaginary line, which connects between an injection-hole-side end part of the second boundary Q2 and the injection-hole-side end part of the second stationary core 51, is referred to as a second reference line L2n. A smallest angle, which is defined between the second reference line L2n and the coil axis C, is referred to as a second reference angle $\theta 2n$. In the present embodiment, a separation distance, which is radially measured between an inner end part Q2a of the second boundary Q2 and the inner end part of the second outside lower surface 53a located on the opposite side of the coil axis C that is diametrically opposite to the inner end part Q2a of the second boundary Q2, is referred to as a separation distance D2. Furthermore, a separation distance, which is axially measured between the inner end part Q2a of the second boundary Q2 and the second outside lower surface 53a, is referred to as a separation distance H2. The second reference angle $\theta 2n$ is computed by using an equation of $\tan \theta 2n = H2/D2$, and the first angle $\theta 1$ is set to a value that satisfies a relationship of $\theta 1 > \theta 2n$. In this way, an upper limit value of the second angle $\theta 2$ is set.

The first angle $\theta 1$ and the second angle $\theta 2$ are set to be relatively large angles that do not cause intersection of any of the extension lines N1, N2 to the valve element 30. In this way, a lower limit value of the first angle $\theta 1$ and a lower limit value of the second angle $\theta 2$ are set. Here, it is assumed that the valve element 30 is in the valve opening state. Furthermore, the separation distance D1, which is relevant to the first boundary Q1, and the separation distance D2, which is relevant to the second boundary Q2, are set to be the same value. Alternatively, the separation distance D1 and the separation distance D2 may be respectively set to be different values, which are different from each other.

With respect to the second stationary core 51, an extension line, which is formed by extending the second outer surface 51d toward the injection-hole side in the axial direction, is referred to as an outer surface extension line N3. In such a case, the intersection point Pn is located between the coil axis C and the outer surface extension line N3 in the radial direction of the coil 70. In this case, due to the presence of the second boundary Q2 on the injection-hole side of the first boundary Q1, a second axis intersection point Pn2, at which the second extension line N2 and the coil axis C intersect with each other, is located on the injection-hole side of a first axis intersection point Pn1, at which the first extension line N1 and the coil axis C intersect with each other. Furthermore, a second outer intersection point Pn4, at which the second extension line N2 and the outer surface extension line N3 intersect with each other, is located on the counter-injection-hole side (rather than the injection-hole side) of a first outer intersection point Pn3, at which the first extension line N1 and the outer surface extension line N3 intersect with each other.

As shown in FIGS. 2 and 3, a stopper 55, which is shaped into a cylindrical tubular form and is made of metal, is fixed to the inner peripheral surface of the first stationary core 50. The stopper 55 is a member that limits movement of the movable structure M toward the counter-injection-hole side through contact of the stopper 55 against the coupling member 31 of the movable structure M. When a lower end surface of the stopper 55 contacts an upper end surface of the enlarged diameter portion 31a of the coupling member 31, the movement of the movable structure M is limited. The stopper 55 projects from the first stationary core 50 toward the injection-hole side. Therefore, even in the state where the movement of the movable structure M is limited by the stopper 55, a predetermined gap is formed between the movable core 41 and each of the stationary cores 50, 51. The gap is formed between the first lower surface 50a and the movable inside upper surface 42a, and the other gap is formed between the second inside lower surface 52a and the movable outside upper surface 43a. In FIG. 3 and the like, for the sake of clear indication of these gaps, a separation distance between the first lower surface 50a and the movable inside upper surface 42a and a separation distance between the second inside lower surface 52a and the movable outside upper surface 43a are exaggerated from the real separation distances.

The coil 70 is placed on the radially outer side of the non-magnetic member 60 and the stationary core 50. The coil 70 is wound around a bobbin 71 made of resin. The bobbin 71 is a shaped into a cylindrical tubular form that is cylindrical about the axis. Therefore, the coil 70 is in a ring form that circumferentially extends about the axis. The bobbin 71 contacts the first stationary core 50 and the non-magnetic member 60. A radially-outer-side opening portion, an upper end surface and a lower end surface of the bobbin 71 are covered by a cover 72 made of resin.

A yoke 75 is placed between the cover 72 and the case 10. The yoke 75 is placed on the counter-injection-hole side of the second stationary core 51 and contacts the second upper surface 51b of the second stationary core 51. Like the stationary cores 50, 51 and the movable core 41, the yoke 75 has a relatively high degree of magnetism and is made of, for example, a ferromagnetic material. The stationary cores 50, 51 and the movable core 41 form the flow passage and are thereby placed at a location where the stationary cores 50, 51 and the movable core 41 contact the fuel. Thus, the stationary cores 50, 51 and the movable core 41 have oil resistance. In contrast, the yoke 75 does not form the flow passage and is thereby placed at a location where the yoke 75 does not contact the fuel. Therefore, the yoke 75 is not made to be oil-resistant. As a result, the degree of magnetism of the yoke 75 is higher than the degree of magnetism of each stationary core 50, 51 and the degree of magnetism of the movable core 41.

In the present embodiment, a cover body 90, which covers the stationary boundary Q between the second stationary core 51 and the body main portion 21, is placed on the radially inner side of the second stationary core 51 and the body main portion 21. The cover body 90 is in a ring form and entirely covers the stationary boundary Q in the circumferential direction of the second stationary core 51. The cover body 90 projects from the second stationary core 51 and the body main portion 21 toward the radially inner side in a state where the cover body 90 is placed across the stationary boundary Q in the axial direction. The body main portion 21 includes a main portion cutout N21, and the second stationary core 51 includes a second cutout N51. The cover body 90 is inserted in these cutouts N21, N51.

At the body main portion 21, the main portion cutout N21 is formed by the main portion outside inner surface 21c and the main portion inside upper surface 21a. The main portion cutout N21 opens toward the injection-hole side in the axial direction and also opens toward the radially inner side. The main portion cutout N21 has a cutout tilt surface N21a that connects between the main portion outside inner surface 21c and the main portion inside upper surface 21a, and the cutout tilt surface N21a makes an inner corner of the main portion cutout N21 in a chamfered form.

At the second stationary core 51, the second cutout N51 is formed by the second inside lower surface 52a and the second outside inner surface 53b. The second outside inner surface 53b extends in the axial direction in a state where the second outside inner surface 53b faces the radially inner side and thereby forms an inner peripheral surface of the second outside 53. The second cutout N51 is formed by the step of the second lower surface 51a of the second stationary core 51 such that the second cutout N51 opens toward the counter-injection-hole side in the axial direction and also opens toward the radially inner side. The second cutout N51 has a cutout tilt surface N51a that connects between the second inside lower surface 52a and the second outside inner surface 53b, and the cutout tilt surface N51a makes an inner corner of the second cutout N51 in a chamfered form.

The main portion cutout N21 and the second cutout N51 are communicated with each other in the axial direction. At the cutouts N21, N51, the cover body 90 is placed between the second inside lower surface 52a and the main portion inside upper surface 21a. The main portion outside inner surface 21c of the body main portion 21 and the second outside inner surface 53b of the second stationary core 51 are flush with each other in the axial direction. A cover outer surface 90a, which is an outer peripheral surface of the cover body 90, overlaps with both of the main portion outside inner surface 21c and the second outside inner surface 53b in a state where the cover outer surface 90a covers the stationary boundary Q from the inner side. However, the cover outer surface 90a does not overlap with the cutout tilt surfaces N21a, N51a.

The cover body 90 includes a cover inside 92 and a cover outside 91. The cover outside 91 forms the cover outer surface 90a, and the cover inside 92 is placed on the radially inner side of the cover outside 91. The cover body 90 includes a cover upper surface 90b, which faces the counter-injection-hole side, and a cover lower surface 90c, which faces the injection-hole side. A surface area of the cover upper surface 90b is the same as a surface area of the cover lower surface 90c.

A counter-injection-hole side upper end surface of the cover inside 92 is placed on the injection-hole side of a counter-injection-hole side upper end surface of the cover outside 91, so that a step is formed at the cover upper surface 90b. The cover lower surface 90c forms a planar injection-hole-side lower end surface of the cover body 90, and a step is not formed at a boundary between the cover inside 92 and the cover outside 91.

A cover cutout N90 is formed at the cover body 90 by the step formed at the cover upper surface 90b. An outer corner of the movable core 41, which is on the injection-hole side and is on the radially outer side, is inserted into the cover cutout N90. In this case, a counter-injection-hole-side end portion of the cover outside 91 is placed between the movable outside and the second outside 53 in the radial direction. Furthermore, the cover inside 92 is placed on the injection-hole side of the second outside 53 in the axial direction.

At the cover body 90, the cover upper surface 90b is spaced from the movable lower surface 41b of the movable core 41 and the second inside lower surface 52a of the second stationary core 51 toward the injection-hole side, and the cover lower surface 90c is spaced from the main portion inside upper surface 21a of the body main portion 21 toward the counter-injection-hole side. The cover outside 91 is interposed between the second outside 53 and the movable outside 43 in the radial direction, and the cover inside 92 is interposed between the movable core 41 and the main portion inside upper surface 21a in the axial direction.

Although a separation distance between the cover inside 92 and the movable core 41 in the axial direction is increased or decreased in response to movement of the movable structure M, the cover inside 92 and the movable core 41 do not contact with each other when the valve element 30 is seated against the seatable surface 23s. In the present embodiment, a space, which is defined by the cover upper surface 90b, the movable core 41 and the second stationary core 51, is referred to as a cover upper chamber S1, and a space, which is defined between the cover lower surface 90c and the body main portion 21, is referred to as a cover lower chamber S2. The cover upper chamber S1 and the cover lower chamber S2 are formed by placing the cover body 90 into the main portion cutout N21 and the second cutout N51. The cover upper chamber S1 is included in the flow passage F26s, and the cover lower chamber S2 is included in the flow passage F31.

The cover body 90 is formed by a cover member 93 and an opposing member 94. The cover member 93 and the opposing member 94 are annular members made of metal. The opposing member 94 is placed on the radially inner side of the cover member 93. The opposing member 94 is fitted to the inner peripheral surface of the cover member 93, and the opposing member 94 and the cover member 93 are joined together by, for example, welding at a boundary between the opposing member 94 and the cover member 93. The cover member 93 includes an outer peripheral surface side portion, which is included in the cover outside 91, and an inner peripheral surface side portion, which is included in the cover inside 92. In contrast, the opposing member 94 is entirely included in the cover inside 92. The opposing member 94 forms an opposing portion and is supported by the cover member 93.

The opposing member 94 includes an opposing inner surface 94a and is placed on the radially outer side of the slide member 33. The opposing inner surface 94a is opposed to the slide surface 33a of the slide member 33 in the radial direction, and the slide surface 33a of the slide member 33 is slidable along the opposing inner surface 94a. In this case, the above-described member, which is provided at the nozzle body 20 side and along which the slide surface 33a is slidable, is the opposing member 94. The opposing inner surface 94a is an inner peripheral surface of the opposing member 94, and a height of the opposing inner surface 94a, which is measured in the axial direction, is smaller than a height of the slide surface 33a, which is measured in the axial direction. The opposing inner surface 94a and the slide surface 33a both extend in parallel with the axial direction. A diameter of the slide surface 33a is slightly smaller than a diameter of the opposing inner surface 94a. Specifically, a position of the slide surface 33a in a direction perpendicular to a sliding direction of the slide member 33 is on the radially inner side, i.e., on the coil axis C side of a radially outermost position of the opposing inner surface 94a.

The slide member 33 is slid along the opposing member 94, so that the opposing member 94 also serves as a guide portion that guides the moving direction of the movable structure M. In this case, the opposing inner surface 94a may be also referred to as a guiding surface or a guide surface. The opposing member 94 forms a guiding portion.

Like the non-magnetic member 60 and the body main portion 21, a degree of magnetism of the cover member 93 and a degree of magnetism of the opposing member 94 are lower than the degree of magnetism of each stationary core 50, 51 and the degree of magnetism of the movable core 41, and the cover member 93 and the opposing member 94 are made of, for example, a non-magnetic material. Therefore, the cover member 93 and the opposing member 94 are hard to become a passage of the magnetic flux. However, desirably the opposing member 94 is made of a material, which has a high hardness and a high strength, to limit wearing and deformation of the opposing inner surface 94a at the time of sliding the slide member 33 along the opposing member 94. In the present embodiment, the high hardness and the high strength of the material of the opposing member 94 are prioritized, and thereby the opposing member 94 is more magnetic than the cover member 93, the non-magnetic member 60 and the body main portion 21. In this case, the opposing member 94 is more likely to be a passage of the magnetic flux in comparison to the cover member 93 or the like. However, the degree of magnetism of the opposing member 94 is lower than the degree of magnetism of each stationary core 50, 51 and the degree of magnetism of the movable core 41, so that the opposing member 94 is less likely to be a passage of the magnetic flux in comparison to the stationary cores 50, 51 or the like.

Referring back to FIG. 1, the pipe connecting portion 80, which forms the flow inlet 80a of the fuel and is connected to an external pipe, is placed on the counter-injection-hole side of the first stationary core 50. The pipe connecting portion 80 is made of metal and is formed by a metal member that is formed integrally with the stationary core 50 in one piece. The fuel, which is pressurized by the high pressure pump, is supplied to the fuel injection valve 1 through the flow inlet 80a. A flow passage F11 of the fuel, which extends in the axial direction, is formed in an inside of the pipe connecting portion 80, and a press-fitting member 81 is securely press fitted into the flow passage F11.

A resilient member SP1 is placed on the injection-hole side of the press-fitting member 81. One end of the resilient member SP1 is supported by the press-fitting member 81, and the other end of the resilient member SP1 is supported by the enlarged diameter portion 32b of the orifice member 32. Therefore, the amount of resilient deformation of the resilient member SP1 at the valve opening time of the valve element 30, at which the valve element 30 is lifted to a full lift position, i.e., at the time of contacting of the coupling member 31 to the stopper 55, is specified according to the amount of press fitting of the press-fitting member 81, i.e., a fixation position of the press-fitting member 81 in the axial direction. Specifically, a valve closing force, which is a set load of the resilient member SP1, is adjusted by the amount of press fitting of the press-fitting member 81.

A fixation member 83 is placed at an outer peripheral surface of the pipe connecting portion 80. A threaded portion, which is formed at an outer peripheral surface of the fixation member 83, is threadably engaged with a threaded portion, which is formed at an inner peripheral surface of the case 10, so that the fixation member 83 is fixed to the case 10. The pipe connecting portion 80, the stationary cores 50, 51, the non-magnetic member 60 and the body main portion 21 are clamped between a bottom surface of the case 10 and the fixation member 83 by an axial force that is generated by the fixation of the fixation member 83 to the case 10.

The pipe connecting portion 80, the stationary core 50, the non-magnetic member 60, the nozzle body 20 and the injection hole member 23 collectively serve as a body B that has a flow passage F. The flow passage F conducts the fuel received through the flow inlet 80a to the injection hole 23a. It can be said that the movable structure M described above is slidably received in the inside of the body B.

Next, an operation of the fuel injection valve 1 will be described.

When the coil 70 is energized, a magnetic field is generated around the coil 70. For example, as indicated by a dotted line in FIG. 4, a magnetic circuit, along which the magnetic flux flows, is formed through the stationary cores 50, 51, the movable core 41 and the yoke 75 in response to the energization, so that the movable core 41 is attracted to the stationary cores 50, 51 by a magnetic force generated by the magnetic circuit. In this case, the first lower surface 50a and the movable inside upper surface 42a become the passage of the magnetic flux, so that the first stationary core 50 and the movable core 41 are attracted to each other. Likewise, the second inside lower surface 52a and the movable outside upper surface 43a become the passage of the magnetic flux, so that the second stationary core 51 and the movable core 41 are attracted to each other. Therefore, the first lower surface 50a, the movable inside upper surface 42a, the second inside lower surface 52a and the movable outside upper surface 43a can be respectively referred to as an attractive surface. Particularly, the movable inside upper surface 42a serves as a first attractive surface, and the movable outside upper surface 43a serves as a second attractive surface.

The non-magnetic member 60 does not become the passage of the magnetic flux, so that the magnetic short circuiting between the first stationary core 50 and the second stationary core 51 is limited. An attractive force between the movable core 41 and the first stationary core 50 is generated by a magnetic flux, which passes through the movable inside upper surface 42a and the first lower surface 50a, and the attractive force between the movable core 41 and the second stationary core 51 is generated by the magnetic flux, which passes through the movable outside upper surface 43a and the second lower surface 51a. The magnetic flux, which passes through the stationary cores 50, 51 and the movable core 41, includes the magnetic flux, which passes through not only the yoke 75 but also the case 10.

Furthermore, since the degree of magnetism of the body main portion 21 and the degree of magnetism of the cover body 90 are lower than the degree of magnetism of each stationary core 50, 51, the flow of the magnetic flux through the body main portion 21 and the cover body 90 is limited. As described above, the high hardness and the high strength of the opposing member 94 are prioritized to withstand the sliding of the slide member 33 along the opposing member 94, and thereby the opposing member 94 becomes more magnetic. However, the degree of the magnetism of the cover member 93 is sufficiently low. Therefore, the cover member 93 limits the magnetic flux from passing through the second stationary core 51 to reach the opposing member 94.

In addition to the attractive force generated by the magnetic flux described above, the valve closing force, which is exerted by the resilient member SP1, the valve closing force, which is exerted by the fuel pressure, and the valve opening force, which is exerted by the magnetic force described above, are applied to the movable structure M. The valve opening force is set to be larger than these valve closing forces. Therefore, when the magnetic force is generated in response to the energization, the movable core 41 is moved together with the valve element 30 toward the counter-injection-hole side. In this way, the valve element 30 makes the valve opening movement, so that the seat surface 30s is lifted away from the seatable surface 23s, and thereby the high pressure fuel is injected from the injection hole 23a.

When the energization of the coil 70 is stopped, the valve opening force, which is generated by the magnetic force described above, is lost. Therefore, the valve element 30 makes the valve closing movement together with the movable core 41 by the valve closing force of the resilient member SP1, so that the seat surface 30s is seated against the seatable surface 23s. In this way, the valve element 30 makes the valve closing movement, and thereby the fuel injection from the injection hole 23a is stopped.

Next, the flow of the fuel at the time of injecting the fuel from the injection hole 23a will be described with reference to FIGS. 1 and 2.

The high pressure fuel, which is supplied from the high pressure pump to the fuel injection valve 1, is inputted into the flow inlet 80a and flows through the flow passage F11, which is along the cylindrical inner peripheral surface of the pipe connecting portion 80, the flow passage F12, which is along the cylindrical inner peripheral surface of the press-fitting member 81, and the flow passage F13, in which the resilient member SP1 is received (see FIG. 1). These flow passages F11, F12, F13 are collectively referred to as an upstream flow passage F10. In the flow passage F formed in the inside of the fuel injection valve 1, the upstream flow passage F10 is located at the outside of the movable structure M and is on the upstream side of the movable structure M. Furthermore, in the flow passage F, a flow passage, which is formed by the movable structure M, will be referred to as a movable flow passage F20, and a flow passage, which is located on the downstream of the movable flow passage F20, will be referred to as a downstream flow passage F30.

The movable flow passage F20 conducts the fuel outputted from the flow passage F13 to a main passage and a sub-passage. The main passage and the sub-passage are independently arranged. Specifically, the main passage and the sub-passage are arranged in parallel, and the fuel, which flows through the main passage, and the fuel, which flows in the sub-passage, are merged at the downstream flow passage F30.

The main passage is a passage that conducts the fuel through the flow passage F21, which is along the cylindrical inner peripheral surface of the orifice member 32, the restricting flow passage F22, which is defined by the orifice 32a, and the flow passage F23, which is along the cylindrical inner peripheral surface of the coupling member 31, in this order. Thereafter, the fuel of the flow passage F23 flows via through-holes, which radially extend through the coupling member 31, and then the fuel flows into the flow passage F31 of the downstream flow passage F30, which is along the cylindrical outer peripheral surface of the coupling member 31. The downstream flow passage F30 includes a cover lower chamber S2 located on the injection-hole side of the cover body 90, and the cover lower chamber S2 is communicated with a gap between the support member 24 and the slide member 33.

The sub-passage is a passage that conducts the fuel through a flow passage F24s, which is along the cylindrical outer peripheral surface of the orifice member 32, a flow passage F25s, which is a gap between the movable core 41 and the stationary core 50, a flow passage F26s, which extends on the radially outer side of the movable core 41, and a slide flow passage F27s, which is along the slide surface 33a, in this order. The flow passage F26s includes a cover upper chamber S1, which is placed on the counter-injection-hole side of the cover body 90. The flow passage F26s includes an interspace defined by the movable core 41 relative to the first stationary core 50, the non-magnetic member 60, the second stationary core 51 and the cover body 90. In the flow passage F26s, an interspace between the first lower surface 50a and the movable inside upper surface 42a and an interspace between the second inside lower surface 52a and the movable outside upper surface 43a are also included in the gap between the movable core 41 and the stationary core 50. The sub-passage is defined between the body main portion 21 and the movable structure M, and the body main portion 21 serves as a passage forming portion, which forms the sub-passage.

The slide flow passage F27s may be referred to as a separate flow passage, and the fuel of the slide flow passage F27s flows into the flow passage F31 of the downstream flow passage F30, which is along the cylindrical outer peripheral surface of the coupling member 31. A passage cross-sectional area of the slide flow passage F27s is smaller than a passage cross-sectional area of the flow passage F26s, which extends on the radially outer side of the movable core 41. Specifically, a degree of flow restriction of the slide flow passage F27s is set to be larger than a degree of flow restriction of the flow passage F26s.

Here, an upstream portion of the sub-passage is connected to a portion that is on the upstream side of the restricting flow passage F22. A downstream portion of the sub-passage is connected to a downstream portion of the restricting flow passage F22. Specifically, the sub-passage connects between the upstream portion of the restricting flow passage F22 and the downstream portion of the restricting flow passage F22 while the sub-passage bypasses the restricting flow passage F22.

The fuel, which flows from the flow passage F13 of the upstream flow passage F10 into the movable flow passage F20, is branched into the flow passage F21, which forms an upstream end of the main passage, and a flow passage F24s, which forms an upstream end of the sub-passage, and the branched flows of the fuel are thereafter merged at the flow passage F31 that is the downstream passage F30.

Through-holes 45 are formed such that each through-hole 45 extends through the movable core 41, the coupling member 31 and the orifice member 32 in the radial direction. The through-holes 45 serve as a flow passage F28s that communicates between the flow passage F21, which is along the inner peripheral surface of the orifice member 32, and the flow passage F26s, which is along the outer peripheral surface of the movable core 41. The flow passage F28s is a passage that ensures a required flow rate of the fuel, which flows in the slide flow passage F27s, i.e., a required flow rate of the sub-passage in a case where the communication between the flow passage F24s and the flow passage F25s is blocked through contact of the coupling member 31 to the stopper 55. The flow passage F28s is placed on the upstream side of the restricting flow passage F22, so that the flow passages F25s, F26s, F28s form an upstream region, and a pressure difference is generated between the upstream region and a downstream region.

The fuel, which is outputted from the movable flow passage F20, flows into the flow passage F31, which is along the cylindrical outer peripheral surface of the coupling member 31, and then the fuel flows through a flow passage F32, which is a through-hole extending through the reduced diameter portion 24a of the support member 24 in the axial direction, and a flow passage F33, which is along the outer peripheral surface of the valve element 30 (see FIG. 2). When the valve element 30 makes the valve opening movement, the high pressure fuel in the flow passage F33 passes through the gap between the seat surface 30s and the seatable surface 23s and is injected from the injection hole 23a.

The flow passage, which is along the slide surface 33a, is referred to as the slide flow passage F27s. A passage cross-sectional area of the slide flow passage F27s is smaller than a passage cross-sectional area of the restricting flow passage F22. Specifically, a degree of flow restriction at the slide flow passage F27s is set to be larger than a degree of flow restriction at the restricting flow passage F22. The passage cross-sectional area of the restricting flow passage F22 is the smallest in the main passage, and the passage cross-sectional area of the slide flow passage F27s is the smallest in the sub-passage.

Therefore, among the main passage and the sub-passage in the movable flow passage F20, the fuel can more easily flow in the main passage. The degree of flow restriction of the main passage is specified by the degree of flow restriction at the orifice 32a, and the flow rate of the main passage is adjusted by the orifice 32a. In other words, the degree of flow restriction of the movable flow passage F20 is specified by the degree of flow restriction at the orifice 32a, and the flow rate of the movable flow passage F20 is adjusted by the orifice 32a.

A passage cross-sectional area of the flow passage F at the seat surface 30s in the full lift state, in which the valve element 30 has moved farthest in the valve opening direction, is referred to as a seat passage cross-sectional area. The passage cross-sectional area of the restricting flow passage F22 defined by the orifice 32a is set to be larger than the seat passage cross-sectional area. Specifically, the degree of flow restriction by the orifice 32a is set to be smaller than the degree of flow restriction at the seat surface 30s at the full lift time.

The seat passage cross-sectional area is set to be larger than the passage cross-sectional area of the injection hole 23a. Specifically, the degree of flow restriction by the orifice 32a and the degree of flow restriction at the seat surface 30s are set to be smaller than the degree of flow restriction at the injection hole 23a. In a case where a plurality of injection holes 23a is formed, the seat passage cross-sectional area is set to be larger than a sum of passage cross-sectional areas of all of the injection holes 23a.

Now, the movable member 35 will be described. When the fuel pressure on the upstream side of the movable member 35 becomes larger than the fuel pressure on the downstream side of the movable member 35 by a predetermined amount or larger in response to the movement of the valve element 30 in the valve opening direction, the movable member 35 is lifted away from the orifice member 32 against the resilient force of the resilient urging member SP2. When the fuel pressure on the downstream side of the movable member 35 becomes larger than the fuel pressure on the upstream side of the movable member 35 by a predetermined amount or larger in response to the movement of the valve element 30 in the valve closing direction, the movable member 35 is seated against the orifice member 32.

In the state where the movable member 35 is lifted away from the orifice member 32, a flow passage, which conducts the fuel, is generated between the outer peripheral surface of the movable member 35 and the inner peripheral surface of the coupling member 31. An outer-peripheral-side flow passage F23a and the sub-restricting passage 38 are arranged in parallel. In the state where the movable member 35 is lifted away from the orifice member 32, the fuel to be outputted from the restricting flow passage F22 to the flow passage F23, is branched into the sub-restricting passage 38 and the outer-peripheral-side flow passage F23a. A sum of the passage cross-sectional area of the sub-restricting passage 38 and the passage cross-sectional area of the outer-peripheral-side flow passage F23a is larger than the passage cross-sectional area of the restricting flow passage F22. Therefore, in the state where the movable member 35 is lifted away from the orifice member 32, the flow rate of the movable flow passage F20 is specified by the degree of flow restriction at the restricting flow passage F22.

In contrast, in the state where the movable member 35 is seated against the orifice member 32, the fuel to be outputted from the restricting flow passage F22 into the flow passage F23 flows in the sub-restricting passage 38 but does not flow in the outer-peripheral-side flow passage F23a. A passage cross-sectional area of the sub-restricting passage 38 is smaller than the passage cross-sectional area of the restricting flow passage F22. Therefore, in the state where the movable member 35 is seated against the orifice member 32, the flow rate of the movable flow passage F20 is specified by the degree of flow restriction at the sub-restricting passage 38. Thus, the movable member 35 increases the degree of flow restriction by covering the restricting flow passage F22 upon seating of the movable member 35 against the orifice member 32 and decreases the degree of flow restriction by opening the restricting flow passage F22 upon lifting of the movable member 35 from the orifice member 32.

In the state where the valve element 30 is in the middle of moving in the valve opening direction, there is a high probability of that the fuel pressure on the upstream side of the movable member 35 becomes larger than the fuel pressure on the downstream side of the movable member 35 by the predetermined amount or larger, and thereby the movable member 35 is lifted away from the orifice member 32. However, in a state where the valve element 30 is held in the full lift state, in which the valve element 30 has moved farthest in the valve opening direction, there is a high possibility of that the movable member 35 is seated against the orifice member 32.

In the state where the valve element 30 is in the middle of moving in the valve closing direction, there is a high possibility of that the fuel pressure on the downstream side of the movable member 35 becomes larger than the fuel pressure on the upstream side of the movable member 35 by the predetermined amount or larger, and thereby the movable member 35 is seated against the orifice member 32. However, in a case where the valve opening period is shortened to reduce the injection amount of fuel injected from the injection hole 23a, the valve element 30 does not move to the full lift position, and thereby valve opening movement is switched to the valve closing movement to execute a partial lift injection. In this case, immediately after the switching from the valve opening movement to the valve closing movement, there is a high possibility of that the movable member 35 is lifted away from the orifice member 32. However, in a time period immediately before the valve closing, there is a high possibility of that the fuel pressure on the downstream side of the movable member 35 becomes larger that the fuel pressure on the upstream side of the movable member 35 by the predetermined amount or larger, and thereby the movable member 35 is seated against the orifice member 32.

In short, the movable member 35 is not necessarily always opened during the middle of the valve opening movement of the valve element 30, and the movable member 35 is seated against the orifice member 32 in at least the time period immediately after the valve opening in the pressure increasing period, in which the valve element 30 is moved in the valve opening direction. Furthermore, the movable member 35 is not necessarily always seated against the orifice member 32 during the middle of the valve closing movement of the valve element 30, and the movable member 35 is seated against the orifice member 32 in at least the time period immediately before the valve closing in the pressure decreasing period, in which the valve element 30 is moved in the valve closing direction. Therefore, in the time period immediately after the valve opening and the time period immediately before the valve closing, the movable member 35 is seated against the orifice member 32, and thereby all of the fuel passes through the sub-restricting passage 38. Thus, in comparison to the time period, in which the movable member 35 is lifted away from the orifice member 32, the degree of flow restriction at the movable flow passage F20 is increased.

Next, pressures, which are generated at the time of moving the movable structure M, will be described with reference to FIG. 4.

In the present embodiment, the restricting flow passage F22 and the slide flow passage F27s are arranged in parallel, and the passage cross-sectional area of the slide flow passage F27s is set to be smaller than the passage cross-sectional area of the restricting flow passage F22. Therefore, the flow passage F is divided into the upstream region and the downstream region while the orifice 32a and the slide flow passage F27s form a boundary between the upstream region and the downstream region.

The upstream region is a region, which is located on the upstream side of the orifice 32a in the fuel flow at the fuel injection time. A portion of the movable flow passage F20, which is located on the upstream side of the slide surface 33a, also belongs to the upstream region. Therefore, the flow passages F21, F24s, F25s, F26s, F28s and the upstream flow passage F10 in the movable flow passage F20 belong to the upstream region. The downstream region is a region, which is located on the downstream side of the orifice 32a in the fuel flow at the fuel injection time. A portion of the movable flow passage F20, which is located on the downstream side of the slide surface 33a, also belongs to the downstream region. Therefore, the flow passage F23 and the downstream flow passage F30 in the movable flow passage F20 belong to the downstream region.

Specifically, when the fuel flows in the restricting flow passage F22, the flow rate of the fuel, which flows in the movable flow passage F20, is restricted by the orifice 32a. Therefore, a pressure difference is generated between an upstream fuel pressure PH, which is a fuel pressure of the upstream region, and a downstream fuel pressure PL, which is a fuel pressure of the downstream region (see FIG. 4). At the time of shifting the valve element 30 from the valve closing state to the valve opening state, the time of shifting the valve element 30 from the valve opening state to the valve closing state, and the time of holding the valve element 30 at the full lift position, the fuel flows in the restricting flow passage F22, and thereby the above-described pressure difference is generated.

The above-described pressure difference, which is generated by the valve opening operation of the valve element 30, is not lost simultaneously with the switching from the valve opening to the valve closing. Rather, the upstream fuel pressure PH and the downstream fuel pressure PL become equal to each other when a predetermined time period elapses from the time of valve closing. In contrast, when the operation is switched from the valve closing to the valve opening in the state where the above-described pressure difference is not generated, the above-described pressure difference is immediately generated at the timing of switching from the valve closing to the valve opening.

During the movement of the movable structure M in the valve opening direction, the fuel of the upstream region is urged and is compressed by the movable structure M, so that the upstream fuel pressure PH is increased. In contrast, the fuel of the upstream region, which is urged by the movable structure M, is restricted by the orifice 32a and is pushed into the downstream region, so that the downstream fuel pressure PL becomes lower than the upstream fuel pressure PH. At the time of the valve opening movement, the fuel flows in the restricting flow passage F22 toward the injection-hole side.

During the movement of the movable structure M in the valve closing direction, the fuel of the downstream region is urged and is compressed by the movable structure M, so that the downstream fuel pressure PL is increased. In contrast, the fuel of the downstream region, which is urged by the movable structure M, is restricted by the orifice 32a and is pushed into the upstream region, so that the upstream fuel pressure PH becomes lower than the downstream fuel pressure PL. At the time of valve closing movement, the fuel flows in the restricting flow passage F22 toward the counter-injection-hole side.

Hereinafter, a manufacturing method of the fuel injection valve 1 will be described with reference to FIGS. 6 and 7. Here, an assembling procedure after manufacturing the respective components will be mainly described.

Figure 6:
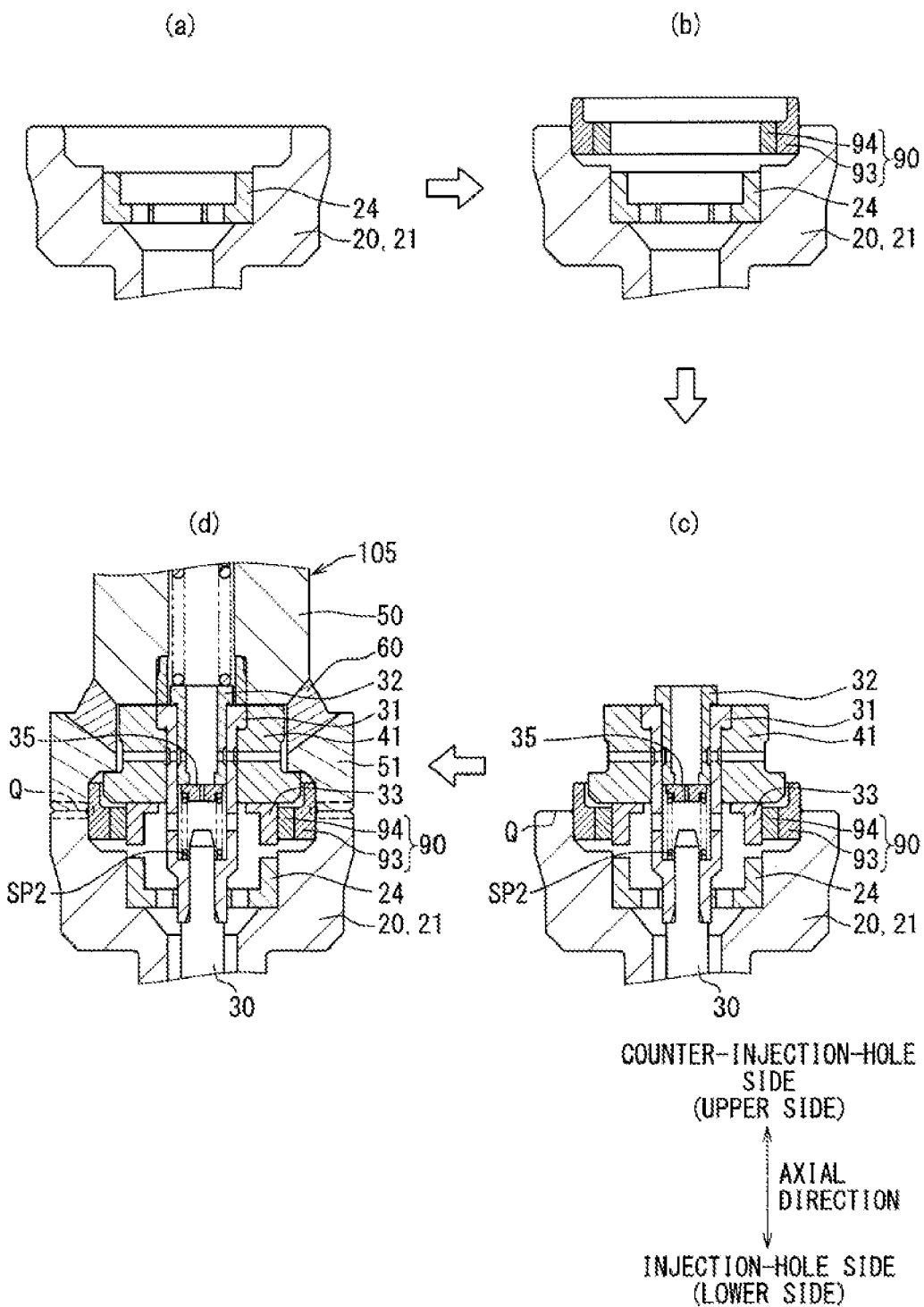
FIG. 6 is a diagram indicating: (a) installation of a support member to a body main portion; (b) installation of a cover body to the body main portion; (c) installation of a movable structure to a nozzle body; and (d) installation of a stationary core and a non-magnetic member to a nozzle body.

As indicated at (a) of FIG. 6, first of all, the support member 24 is installed to the body main portion 21 of the nozzle body 20. Here, the support member 24 is inserted into the inside of the body main portion 21, and the body main portion 21 and the support member 24 are fixed together by, for example, welding.

Next, as indicated at (b) of FIG. 6, the cover body 90 is installed to the body main portion 21. Here, the opposing member 94 is inserted into the inside of the cover member 93, and the cover member 93 and the opposing member 94 are fixed together by, for example, welding. Thereby, the cover body 90 is produced in advance. Then, the cover body 90 is inserted into the inside of the body main portion 21. In this case, a length of the inserted portion of the cover body 90, which is inserted into the inside of the body main portion 21, and a length of the projecting portion of the cover body 90, which projects from the body main portion 21, are set to be substantially equal to each other.

Thereafter, as indicated at (c) of FIG. 6, the movable structure M is installed to the nozzle body 20. The movable structure M is manufactured in advance by assembling the movable core 41, the coupling member 31, the valve element 30, the orifice member 32, the slide member 33, the movable member 35 and the resilient urging member SP2 together. Here, the movable structure M is installed to the nozzle body 20 by inserting the valve element 30 into the inside of the nozzle portion 22 and inserting the slide member 33 into the inside of the cover body 90.

Next, as indicated at (d) of FIG. 6, the stationary cores 50, 51 and the non-magnetic member 60 are installed to the nozzle body 20. Here, a core unit 105 is manufactured in advance by installing the stationary cores 50, 51 to the non-magnetic member 60 and fixing the non-magnetic member 60 and the stationary cores 50, 51 together by, for example, welding. A manufacturing procedure of the core unit 105 will be described. Then, the core unit 105 is installed to the nozzle body 20, and thereby the second stationary core 51 is installed to the body main portion 21 and the cover body 90. In this case, the end portion of the cover body 90 is inserted into the inside of the second stationary core 51, and the second lower surface 51a of the second stationary core 51 is overlapped with the main portion outside upper surface 21b of the body main portion 21. In this way, the stationary boundary Q is present between the second stationary core 51 and the body main portion 21.

Then, the welding is performed to the stationary boundary Q. In this case, spatter particles, such as slag, metal particles or the like, which are generated at the time of welding, may possibly be scattered into the inside space of the second stationary core 51 and the body main portion 21 through the stationary boundary Q. With respect to this point, the cover body 90 covers the stationary boundary Q from the radially inner side, so that even if the spatter particles are generated by the welding, the spatter particles collide against the cover body 90 and will not fly further toward the radially inner side. Therefore, scattering of the spatter particles beyond the stationary boundary Q toward the radially inner side is limited by the cover body 90.

After the second stationary core 51 and the body main portion 21 are welded together, the coil 70 and the yoke 75 are installed to the first stationary core 50. Then, these components are received in the case 10, so that the manufacturing of the fuel injection valve 1 is completed.

Now, the manufacturing procedure of the core unit 105 will be described with reference to FIGS. 7 and 8.

First of all, an assembling work for assembling the core unit 105 is performed by using the stationary cores 50, 51 and the non-magnetic member 60. In FIG. 7, the non-magnetic member 60 is installed to the first stationary core 50, and the first stationary core 50 and the non-magnetic member 60 are positioned relative to each other. Then, welding is performed to the first boundary Q1, and thereby the first welding portion 101, which joins between the first stationary core 50 and the non-magnetic member 60, is formed.

Figure 7:
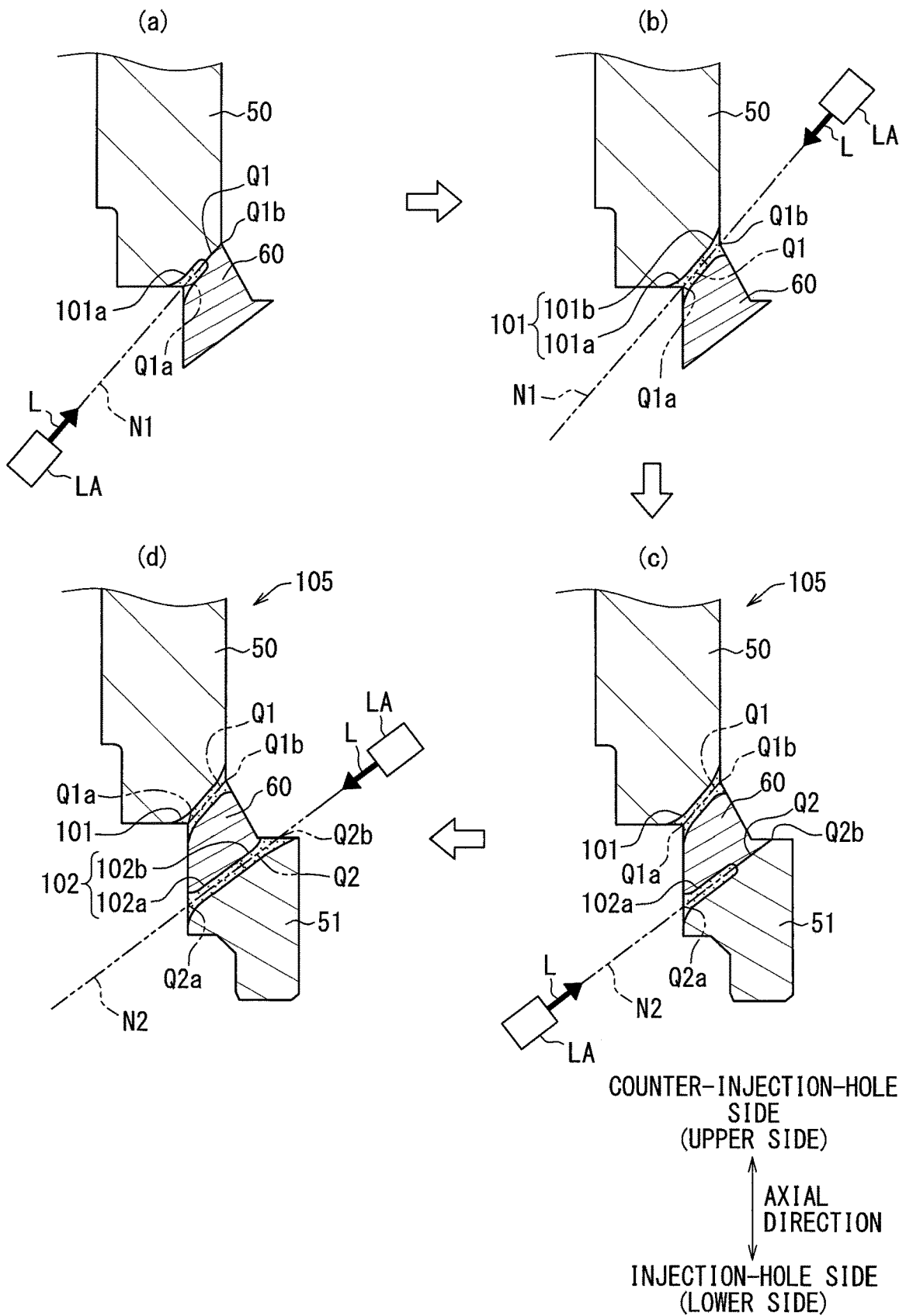
FIG. 7 is a diagram indicating (a) a welding operation performed by applying heat from an inner end part of a first boundary with a laser device; (b) a change in a positional relationship of the laser device relative to a first stationary core and a non-magnetic member; (c) a change in a positional relationship of the laser device relative to the core unit; and (d) a change in a positional relationship of the laser device relative to the core unit.

Specifically, as indicated at (a) of FIG. 7, the welding is performed by applying the heat from the inner end part Q1a of the first boundary Q1 through use of a laser device LA, which outputs a laser beam L. Here, the laser device LA is positioned relative to the first stationary core 50 and the non-magnetic member 60 such that the laser beam L reaches the first boundary Q1 along the first extension line N1. Then, the laser beam L, which is outputted from the laser device LA, is applied to the inner end part Q1a of the first boundary Q1 along the entire circumferential extent of the first boundary Q1. In this way, an inner welding portion 101a, which extends from the inner end part Q1a toward an outer end part Q1b of the first boundary Q1 is formed. The laser beam irradiation from the laser device LA is continuously performed until the inner welding portion 101a reaches an area that is on the outer end part Q1b side of a center of the first boundary Q1 in the extending direction of the first extension line N1. It is difficult for the inner welding portion 101a to reach the outer end part Q1b when an ordinary laser beam irradiation method and an ordinary laser beam irradiation time period are used.

A required strength of the laser beam L, a required temperature and a required irradiation time period of the laser beam L, which are required for the inner welding portion 101a to reach the area beyond the center of the center of the first boundary Q1 in the case of irradiating the laser beam L for the welding, are obtained in advance through tests before the time of performing the laser welding. Then, a strength of the laser beam L, a temperature and an irradiation time period of the laser beam L at the time of performing the laser welding are set based on this test result. In this way, it is possible to limit occurrence of that the inner welding portion 101a does not reach the area beyond the center of the first boundary Q1.

Thereafter, the positional relationship of the laser device LA relative to the first stationary core 50 and the non-magnetic member 60 is changed, as indicated at (b) of FIG. 7. Then, by irradiating the laser beam L from the laser device LA to the outer end part Q1b of the first boundary Q1 along the first extension line N1 to apply the heat to the outer end part Q1b, an outer welding portion 101b, which extends from the outer end part Q1b toward the inner welding portion 101a, is formed. The laser beam irradiation from the laser device LA is continuously performed until the outer welding portion 101b reaches the inner welding portion 101a at an intermediate location of the first boundary Q1 in the extending direction of the first extension line N1. In this way, the first welding portion 101 is formed in the state where the outer welding portion 101b and the inner welding portion 101a are joined together.

A required strength of the laser beam L, a required temperature and a required irradiation time period of the laser beam L, which are required for the outer welding portion 101b to reach the inner welding portion 101a, are obtained in advance through tests. Specifically, the required strength of the laser beam L, the required temperature and the required irradiation time period of the laser beam L, which are required for the outer welding portion 101b to reach at least the center of the first boundary Q1, are obtained through the tests. Then, a strength of the laser beam L, a temperature and an irradiation time period of the laser beam L at the time of performing the laser welding are set based on this test result. In this way, it is possible to limit occurrence of that the outer welding portion 101b does not reach the inner welding portion 101a.

Next, the second stationary core 51 is installed to the non-magnetic member 60, and the non-magnetic member 60 and the second stationary core 51 are positioned relative to each other at the core unit 105. Then, welding is performed to the second boundary Q2, and thereby the second welding portion 102, which joins between the non-magnetic member 60 and the second stationary core 51, is formed.

Specifically, the positional relationship between the core unit 105 and the laser device LA is changed as shown at (c) of FIG. 7. Then, by irradiating the laser beam L from the laser device LA to the inner end part Q2a of the second boundary Q2 along the second extension line N2 to apply the heat to the inner end part Q2a, an inner welding portion 102a, which extends from the inner end part Q2a toward an outer end part Q2a, is formed. The laser beam irradiation from the laser device LA is continuously performed until the inner welding portion 102a reaches an area that is on the outer end part Q2b side of a center of the second boundary Q2 in the extending direction of the second extension line N2. Similar to the first boundary Q1, it is difficult for the inner welding portion 102a to reach the outer end part Q2b at the second boundary Q2 when the ordinary laser beam irradiation method and the ordinary laser beam irradiation time period are used.

Thereafter, the positional relationship between the core unit 105 and the laser device LA is changed as shown at (d) of FIG. 7. Then, by irradiating the laser beam L from the laser device LA to the outer end part Q2a of the second boundary Q2 along the second extension line N2 to apply the heat to the outer end part Q2a, an outer welding portion 102b, which extends from the outer end part Q2a toward the inner welding portion 102a, is formed. The laser beam irradiation from the laser device LA is continuously performed until the outer welding portion 102b reaches the inner welding portion 102a at an intermediate location of the second boundary Q2 in the extending direction of the second extension line N2. In this way, the second welding portion 102 is formed in the state where the outer welding portion 102b and the inner welding portion 102a are joined together.

Similar to the tests performed for the welding of the first boundary Q1, a required strength of the laser beam L, a required temperature and a required irradiation time period of the laser beam L are also obtained through tests for the welding of the second boundary Q2. In this way, it is possible to limit occurrence of that the inner welding portion 102a does not extend beyond the center of the second boundary Q2, and the outer welding portion 102b does not reach the inner welding portion 102a along the second boundary Q2.

After the completion of the assembling process of the core unit 105 upon the welding, a shaping process for adjusting a shape of the core unit 105 is performed. The core unit 105 after the welding is in a state where excess portions 106a, 107 are present at the stationary cores 50, 51 and the non-magnetic member 60, as shown in FIG. 8. Here, it should be noted that indication of the excess portions 106a, 107 is omitted in FIG. 7 for the sake of clarity.

Figure 8:
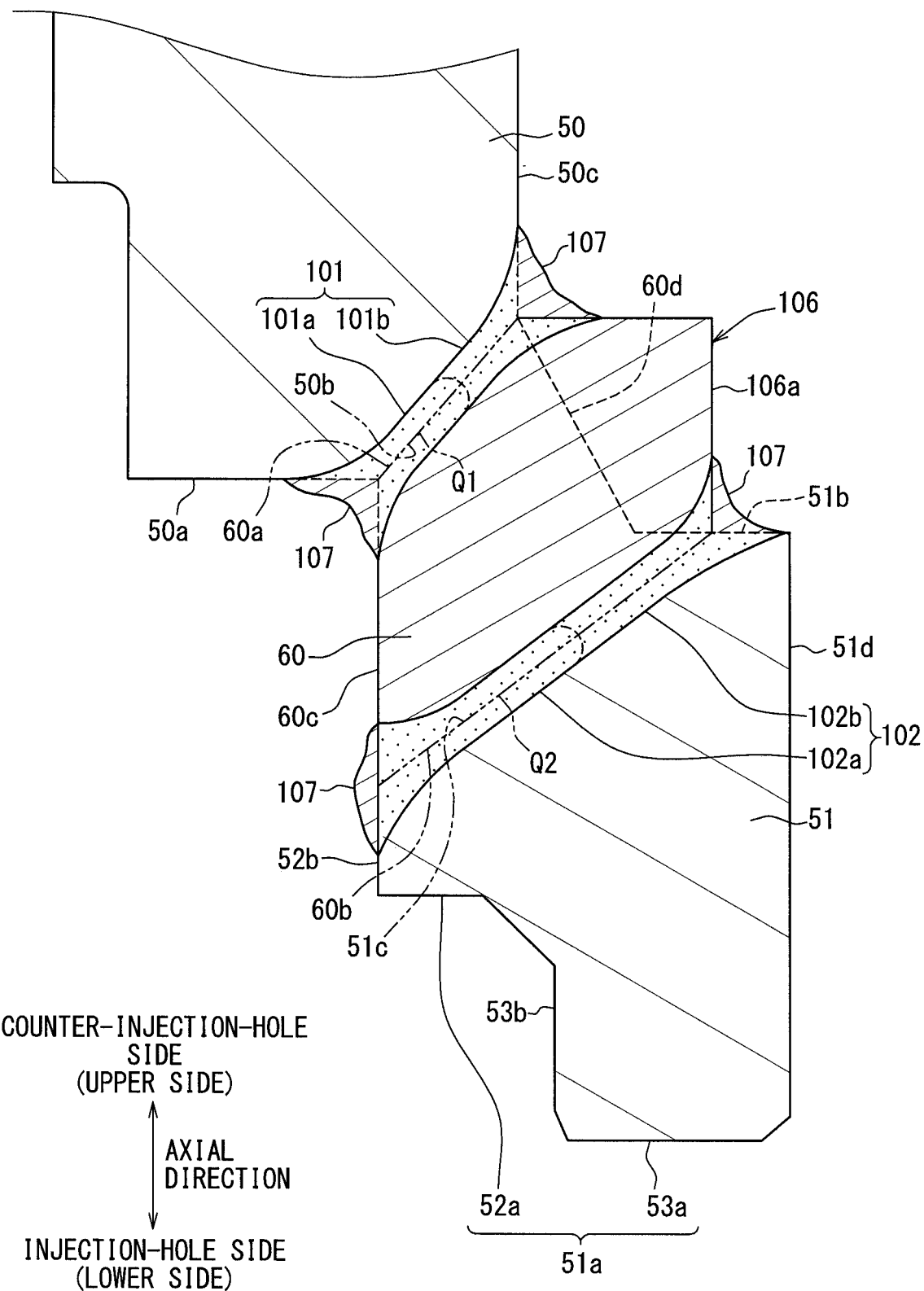
FIG. 8 is a descriptive diagram for describing excess portions of the core unit.

As shown in FIG. 8, at the time of assembling the core unit 105, an original member 106, which is a component used to form the non-magnetic member 60, is welded to the stationary cores 50, 51. The original member 106 is configured such that a member excess portion 106a is formed integrally in one piece with a portion that forms the non-magnetic member 60. The member excess portion 106a has a reference surface that serves as a reference of tilt angles of the upper tilt surface 60a and the lower tilt surface 60b of the non-magnetic member 60 at the time of forming the upper tilt surface 60a and the lower tilt surface 60b. Thus, the presence of the member excess portion 106a in the original member 106 enables an increase in an accuracy of the tilt angles of the tilt surfaces 60a, 60b.

In the state where the stationary cores 50, 51 and the original member 106 are welded together, welding excess portions 107, such as beads generated through the welding, are joined to the boundaries Q1, Q2. For example, the welding excess portion 107, which is joined to the inner end part Q1a of the first boundary Q1, extends along both of the first stationary core 50 and the non-magnetic member 60. The first lower surface 50a and the non-magnetic inner surface 60c are formed by removing this welding excess portion 107 at the inner end part Q1a. Furthermore, the welding excess portion 107, which is joined to the inner end part Q2a of the second boundary Q2, extends along both of the second stationary core 51 and the non-magnetic member 60. The second inside inner surface 52b and the non-magnetic inner surface 60c are formed by removing this welding excess portion 107 at the inner end part Q2a. The first lower surface 50a, the second inside inner surface 52b and the non-magnetic inner surface 60c serve as flow passage surfaces that form the flow passages F25s, F26s of the restricting flow passage F22.

Furthermore, the member excess portion 106a and the welding excess portions 107 are joined to the outer end part Q1b of the first boundary Q1 and the outer end part Q2a of the second boundary Q2. The first outer surface 50c, the second upper surface 51b and the non-magnetic outer surface 60d are formed by removing the member excess portion 106a and the welding excess portions 107.

Next, effects and advantages of the structure used in the present embodiment will be described.

According to the present embodiment, at the opposite side, which is diametrically opposite to the first boundary Q1 and the second boundary Q2 about the coil axis C, the first extension line N1 and the second extension line N2 do not intersect with the stationary cores 50, 51 and the non-magnetic member 60. In this case, at the time of irradiating the laser beam L to the inner end part Q1a, Q2a of each boundary Q1, Q2, it is possible to avoid occurrence of that the laser beam L is blocked by one or more of the stationary cores 50, 51 and the non-magnetic member 60 and thereby cannot reach the boundary Q1, Q2. Therefore, at each of the boundaries Q1, Q2, the outer welding portion 101b, 102b, which is formed by starting the laser welding from the outer end part of the boundaries Q1, Q2, and the inner welding portion 101a, 102a, which is formed by starting the laser welding from the inner end part, can be easily integrated together. In other words, the above setting serves as a countermeasure against occurrence of that the inner welding portion 101a, 102a cannot reach to the outer end part Q1b, Q2b by the welding performed only from the inside, or the outer welding portion 101b, 102b cannot reach to the inner end part Q1a, Q2a by the welding performed only from the outside.

In this case, thereby, even when the length of each of the boundaries Q1, Q2 is increased to increase a contact surface area between the stationary core 50, 51 and the non-magnetic member 60, the stationary cores 50, 51 and the non-magnetic member 60 can be joined together by the welding portions 101, 102 along the entire extent of the respective boundaries Q1, Q2. In this way, it is possible to limit occurrence of separation of the stationary cores 50, 51 and the non-magnetic member 60 from each other in the axial direction and occurrence of leakage of the fuel from the boundaries Q1, Q2. Therefore, the fuel can be appropriately injected from the injection hole 23a.

According to the present embodiment, since each of the welding portions 101, 102 includes the inner welding portion 101a, 102a and the outer welding portion 101b, 102b, the stationary cores 50, 51 and the non-magnetic member 60 can be further strongly fixed together by the welding. Furthermore, since each of the inner welding portions 101a, 102a includes the inner end part Q1a, Q2a of the boundary Q1, Q2, it is possible to limit intrusion of the fuel into the boundaries Q1, Q2 from the flow passages F25s, F26s. For this reason, it is possible to limit the leakage of the fuel from the boundary portions Q1, Q2.

According to the present embodiment, since the inner welding portion 101a, 102a and the outer welding portion 101b, 102b are joined together at each of the welding portions 101, 102, the stationary cores 50, 51 and the non-magnetic member 60 are joined together along the entire extent of the respective boundaries Q1, Q2. Therefore, the stationary cores 50, 51 and the non-magnetic member 60 can be further strongly joined together.

According to the present embodiment, the movable core 41 has the movable inside upper surface 42a and the movable outside upper surface 43a as the two attractive surfaces. Therefore, in comparison to a structure, in which the movable core 41 has only a single attractive surface, it is possible to increase the attractive force between the movable core 41 and the stationary cores 50, 51. Thus, even when the fuel pressures PH, PL are increased, the valve element 30 can be appropriately moved from the valve closing state to the valve opening state. In the present embodiment, at the opposite side, which diametrically is opposite to the boundaries Q1, Q2 about the coil axis C, the extension lines N1, N2 do not intersect with the stationary cores 50, 51 and the non-magnetic member 60. Therefore, the inner welding portion 101a, 102a and the outer welding portion 101b, 102b can be easily formed along each of the boundaries Q1, Q2 in order to appropriately maintain the joint state between the stationary cores 50, 51 and the non-magnetic member 60 even when the fuel pressures PH, PL are increased.

According to the present embodiment, in the structure where the first boundary Q1 is placed on the side of the second boundary Q2, which is far from the opening end of the core unit 105, the first angle $\theta1$ of the first boundary Q1 is set to be smaller than the second angle $\theta2$ of the second boundary Q2. Therefore, it is possible to implement the structure where both of the first extension line N1 and the second extension line N2 do not intersect with the stationary cores 50, 51 and the non-magnetic member 60 at the opposite side, which diametrically opposite to the boundaries Q1, Q2 about the coil axis C.

According to the present embodiment, the first axis intersection point Pn1 is located on the counter-injection-hole side of the second axis intersection point Pn2. Therefore, it is possible to implement the structure where the magnetic flux, which passes between the movable core 41 and the stationary cores 50, 51, is held in an appropriate state while easily implementing the laser welding at the inner end part Q1a, Q2a of the respective boundaries Q1, Q2. Furthermore, the above-described structure is implemented by the presence of the first outer intersection point Pn3 on the injection-hole side of the second outer intersection point Pn4.

According to the present embodiment, at the time of manufacturing the core unit 105, the laser beam L is irradiated to the inner end part Q1a, Q2a and the outer end part Q1b, Q2b of each of the boundaries Q1, Q2. Therefore, the inner welding portion 101a, 102a and the outer welding portion 101b, 102b can be easily formed. Furthermore, the irradiation of the laser beam L to the inner end part Q1a, Q2a is performed before the irradiation of the laser beam L to the outer end part Q1b, Q2b. Therefore, the irradiation of the laser beam L toward the radially inner side of the core unit 105 is performed after the formation of the inner welding portion 101a, 102a. In this case, at the time of forming the outer welding portion 101b, 102b, the presence of the inner welding portion 101a, 102a can limit the flying of the spatter particles, such as the slug and the metal particles, toward the radially inner side of the core unit 105 through the boundary Q1, Q2. Therefore, it is possible to limit the adhesion of the spatter particles to the inner peripheral surfaces of the stationary cores 50, 51 and the non-magnetic member 60.

According to the present embodiment, at the time of manufacturing the core unit 105, after the completion of the welding of the stationary cores 50, 51 and the non-magnetic member 60 by the laser beam L, the excess portions 106a, 107 are removed from the stationary cores 50, 51 and the non-magnetic member 60. Therefore, even when the welding is performed at the first stationary core 50, the accuracy of the angle and the accuracy of the flatness of the first lower surface 50a, which is the attractive surface of the first stationary core 50, can be improved. In this way, the magnetic flux can appropriately flow between the first stationary core 50 and the movable core 41, and thereby the attractive force can be appropriately generated between the first stationary core 50 and the movable core 41. Furthermore, in this case, even when the welding is performed to the stationary cores 50, 51 and the non-magnetic member 60, the accuracy of the angle and the accuracy of the flatness can be improved at the first lower surface 50a, the second inside inner surface 52b and the non-magnetic inner surface 60c, which are the flow passage surfaces of the stationary cores 50, 51 and the non-magnetic member 60. In this way, it is possible to implement the structure that enables the appropriate flow of the fuel at the flow passages F25s, F26s.

Second Embodiment

Figure 9:
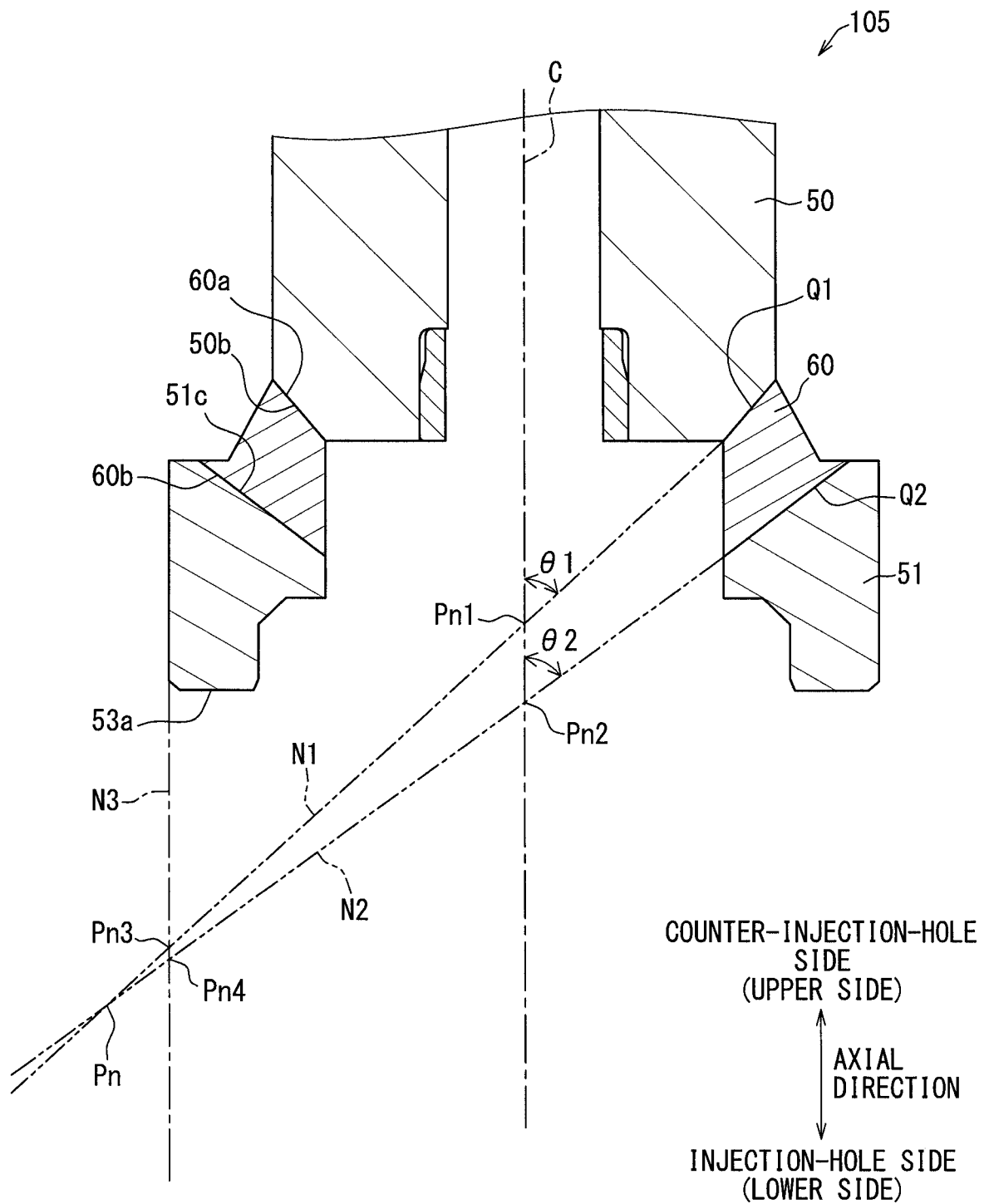
FIG. 9 is a descriptive diagram for describing a core unit according to a second embodiment.

In the first embodiment, the intersection point Pn, at which the extension lines N1, N2 intersect with each other, is placed between the coil axis C and the outer surface extension line N3 in the radial direction. In contrast, according to the second embodiment, the intersection point Pn is not placed between the coil axis C and the outer surface extension line N3. Specifically, as indicated in FIG. 9, the intersection point Pn is placed on a side of the outer surface extension line N3, which is opposite to the coil axis C. With this structure, the laser device LA can be placed at a location where the laser device LA overlaps with the intersection point Pn at the time of manufacturing the core unit 105. In this case, the laser beam L can be irradiated to both of the first boundary Q1 and the second boundary Q2 by changing an irradiation angle of the laser beam L through rotation of the laser device LA without a need for changing a relative distance between the core unit 105 and the laser device LA. In this way, with respect to the core unit 105, the work load at the time of forming the inner welding portions 101a, 102a can be reduced.

Here, the intersection point Pn may be placed on the side of the coil axis C, which is opposite to the outer surface extension line N3. In this case, the laser beam L can be spaced away from the core unit 105 as much as possible on the side of the coil axis C, which is opposite to the irradiated portion of the first boundary Q1 irradiated with the laser beam L, at the time of forming the inner welding portion 101a. In this way, application of the laser beam L to an unintended portion of the core unit 105 can be more reliably limited at the time of forming the inner welding portion 101a of the first welding portion 101.

Third Embodiment

Figure 10:
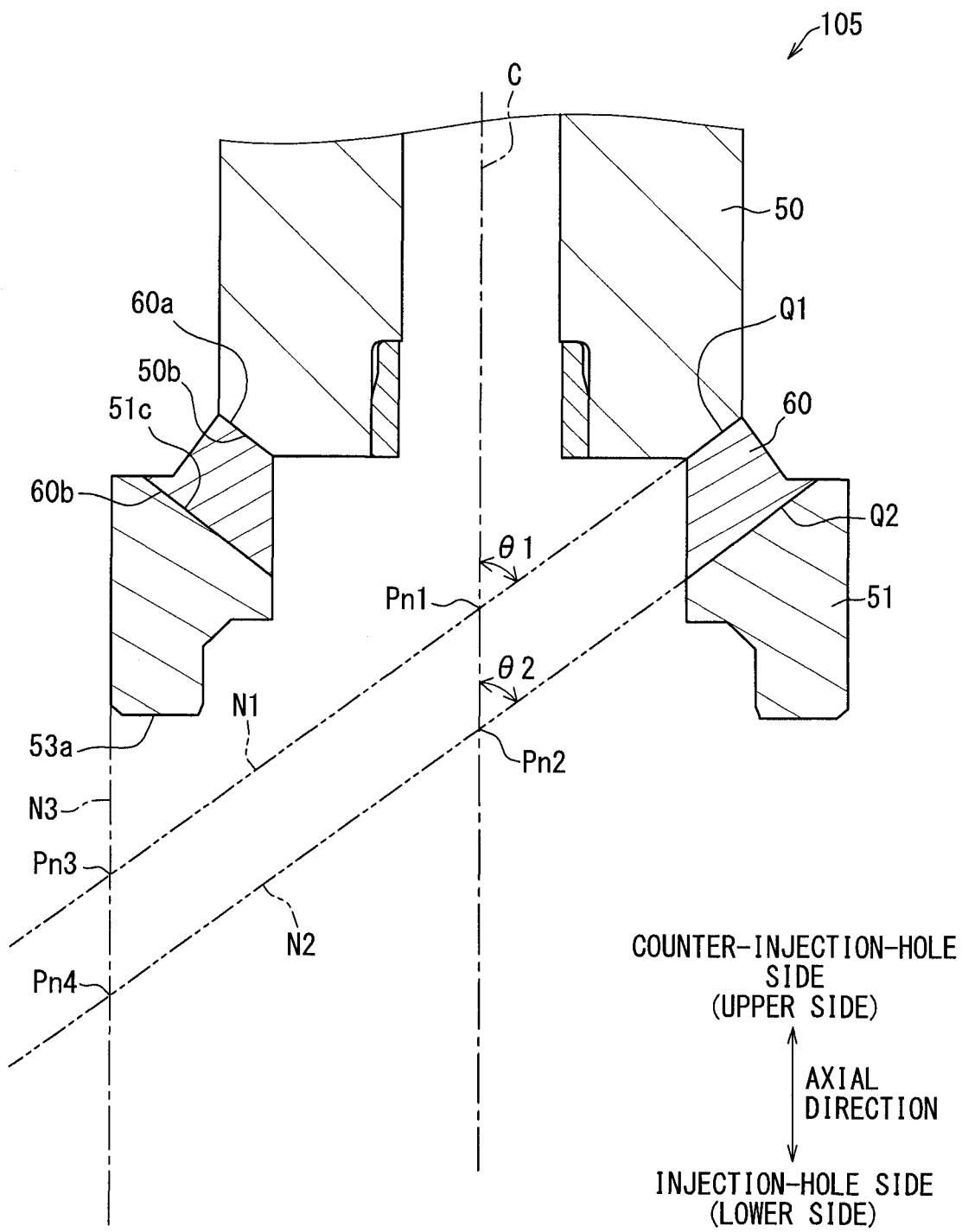
FIG. 10 is a descriptive diagram for describing a core unit according to a third embodiment.

In the first embodiment, the first angle θ1 of the first extension line N1 is set to be smaller than the second angle θ2 of the second extension line N2. In contrast, in a third embodiment, the first angle θ1 is not smaller than the second angle θ2. Specifically, as shown in FIG. 10, the first angle θ1 and the second angle θ2 are identical to each other. In this case, the first extension line N1 and the second extension line N2 are parallel to each other, and the intersection point Pn does not exist. With this configuration, at the time of manufacturing the core unit 105, the irradiation angle of the laser beam L to the first boundary Q1 and the irradiation angle of the laser beam L to the second boundary Q2 are identical to each other. In this case, the laser beam L can be irradiated to both of the first boundary Q1 and the second boundary Q2 by, for example, moving one of the laser device LA and the core unit 105 in parallel relative to the other one of the laser device LA and the core unit 105 without a need for changing the irradiation angle of the laser beam L from the laser device LA. In this way, with respect to the core unit 105, the work load at the time of forming the inner welding portions 101a, 102a can be reduced.

Furthermore, the first angle θ1 may be set to be larger than the second angle θ2. In this case, the first extension line N1 and the second extension line N2 are progressively spaced from each other on the coil axis C side when the separation distance from the boundaries Q1, Q2 is increased. With this structure, the intersection point Pn exits on the radially outer side of the core unit 105 instead of on the coil axis C side.

Fourth Embodiment

Figure 11:
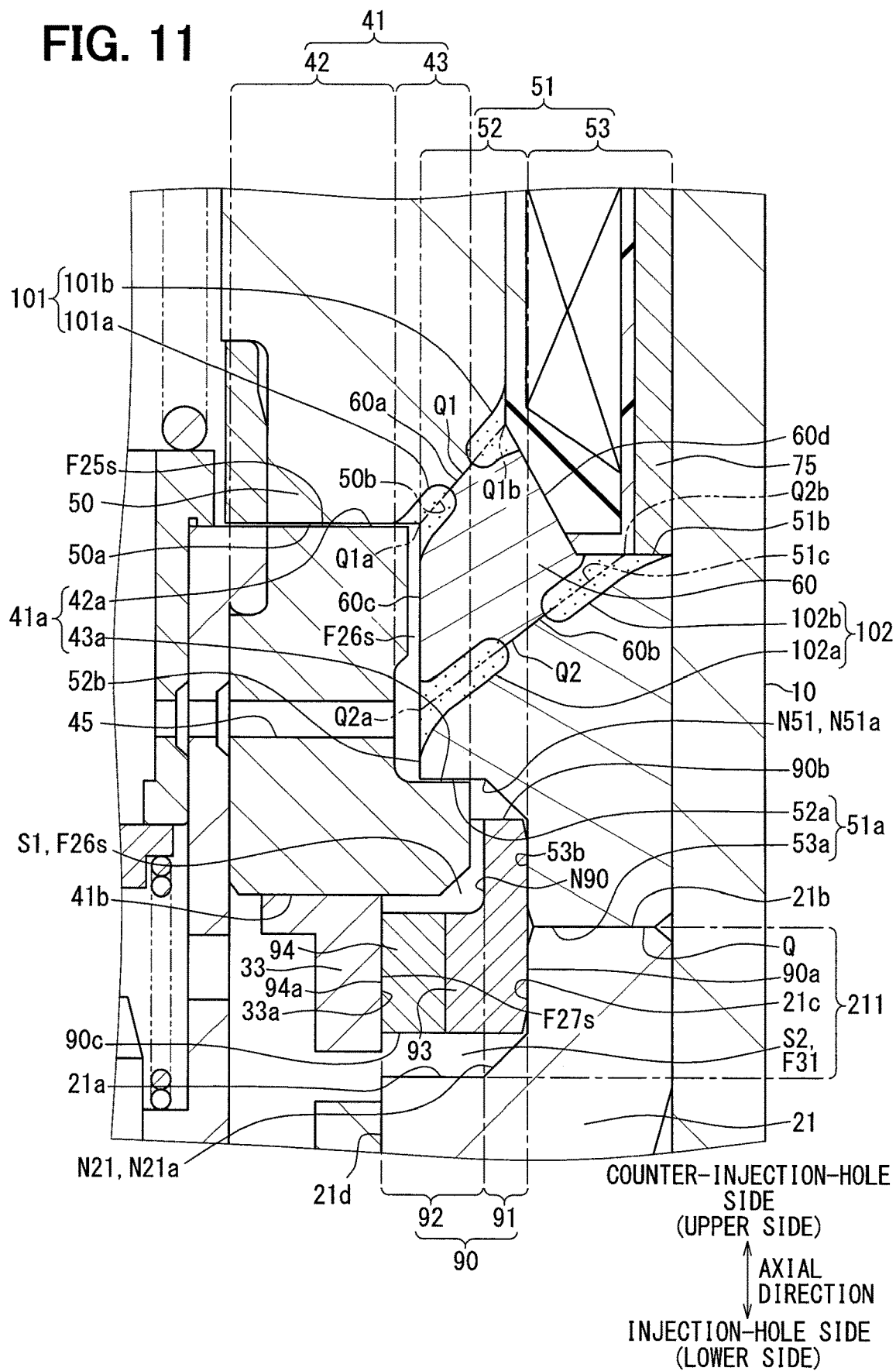
FIG. 11 is an enlarged view showing an area around a first welding portion and a second welding portion according to a fourth embodiment.

In the first embodiment, the inner welding portion 101a, 102a and the outer welding portion 101b, 102b are joined together at each of the welding portions 101, 102. In contrast, in a fourth embodiment, as shown in FIG. 11, the inner welding portion 101a, 102a and the outer welding portion 101b, 102b are spaced from each other. In this structure, each boundary Q1, Q2 is not entirely included in the welding portion 101, 102. Rather, a portion of each boundary Q1, Q2 is left between the inner welding portion 101a, 102a and the outer welding portion 101b, 102b even after the completion of the welding. Even in this case, the inner end part Q1a, Q2a of the boundary Q1, Q2 is lost by the inner welding portion 101a, 102a, and the outer end part Q1b, Q2b of the boundary Q1, Q2 is lost by the outer welding portion 101b, 102b. Therefore, intrusion of the fuel from the flow passages F25s, F26s to the boundaries Q1, Q2 can be limited.

Here, it should be noted that the above-described structure, in which the inner welding portion and the outer welding portion are spaced from each other, may be applied to only one of the first welding portion 101 and the second welding portion 102.

Other Embodiments

The embodiments of the present disclosure have been described. However, the present disclosure should not be limited to the above embodiments and can be applied to various embodiments and combinations of the embodiments without departing from the scope of the present disclosure.

In the first embodiment, the first axis intersection point Pn1 is placed on the counter-injection-hole side of the second axis intersection point Pn2. Alternatively, in a first modification, the first axis intersection point Pn1 may be placed on the injection-hole side of the second axis intersection point Pn2. Further alternatively, the first axis intersection point Pn1 and the second axis intersection point Pn2 may be placed at the same location.

In the first embodiment, the first outer intersection point Pn3 is placed on the injection-hole side of the second outer intersection point Pn4. Alternatively, in a second modification, the first outer intersection point Pn3 may be placed on the counter-injection-hole side of the second outer intersection point Pn4. Further alternatively, the first outer intersection point Pn3 and the second outer intersection point Pn4 may be placed at the same location.

In each of the above embodiments, at the opposite side, which is diametrically opposite to the proximal end portions of the first extension line N1 and the second extension line N2 about the coil axis C, the first extension line N1 and the second extension line N2 do not intersect with the core unit 105. Alternatively, in a third modification, one of the extension lines N1, N2 may intersect with the core unit 105. For example, only for the first boundary Q1, which has the smaller length in comparison to the second boundary Q2, the first extension line N1 may intersect with the core unit 105. With respect to this structure, due to the relatively small length of the first boundary Q1, if the outer welding portion 101b can reach the inner end part Q1a only by the irradiation of the laser beam L to the outer end part Q1b, it is not required to irradiate the laser beam L to the inner end part Q1a from the inside of the core unit 105. In contrast, even though the length of the second boundary Q2 is relatively large, both of the inner welding portion 102a and the outer welding portion 102b can be easily formed at the second boundary Q2 due the fact of that the second extension line N2 does not intersect with the core unit 105.

In a fourth modification, the movable core 41 of each of the above embodiments may be configured such that the movable outside upper surface 43a may be placed on the counter-injection-hole side of the movable inside upper surface 42a instead of placing the movable outside upper surface 43a on the injection-hole side of the movable inside upper surface 42a. Furthermore, the movable outside upper surface 43a and the movable inside upper surface 42a may be placed at the same location in the axial direction. Specifically, the movable outside upper surface 43a and the movable inside upper surface 42a may be placed adjacent to each other in the radial direction. In any of these cases, it is only required that at least one of the first extension line N1 and the second extension line N2 does not intersect with the core unit 105 at the opposite side, which is diametrically opposite to the proximal end portions of the first extension line N1 and the second extension line N2 about the coil axis C.

In each of the above embodiments, the two stationary cores 50, 51 are provided. Alternatively, in a fifth modification, a single stationary core may be provided in place of the two stationary cores 50, 51. For example, only the first stationary core 50 may be provided. In this structure, the movable core 41 does not have the two attractive surfaces. Instead, the movable inside upper surface 42a serves as a single attractive surface of the movable core 41. Even in this case, it is only required that the first extension line N1 does not intersect with the core unit 105 at the opposite side, which is diametrically opposite to the proximal end portion of the first extension line N1 about the coil axis C.

In each of the above embodiments, at the boundaries Q1, Q2, the welding portions 101, 102 are formed by the welding. In a sixth modification, the welding portions 101, 102 may not be formed. Specifically, at least one of the first stationary core 50 and the second stationary core 51 may not be welded to the non-magnetic member 60. Even in this case, since the boundaries Q1, Q2 are tilted relative to the coil axis C, the stationary cores 50, 51, the non-magnetic member 60 and the body main portion 21 may be clamped between the bottom surface of the case 10 and the fixation member 83. Furthermore, since the extension lines N1, N2 are angled such that the extension lines N1, N2 do not intersect with the core unit 105 at the opposite side, which is diametrically opposite to the boundaries Q1, Q2 about the coil axis C, the attractive force can be appropriately exerted between the movable core 41 and the stationary cores 50, 51.

In each of the above embodiments, the non-magnetic member 60 is provided as the magnetic-flux limiting portion. In a seventh modification, the magnetic-flux limiting portion may not be formed by the non-magnetic material. For example, the magnetic-flux limiting portion may be formed by a magnetic material that has a degree of magnetism, which is lower than that of the movable core 41 and the stationary cores 50, 51. Even in this case, it is possible to implement the structure where the magnetic flux can more easily pass through the movable core 41 and the stationary cores 50, 51 in comparison to the magnetic-flux limiting portion.

In each of the above embodiments, the outer welding portion 101b, 102b is formed after the inner welding portion 101a, 102a is formed. Alternatively, in an eighth modification, the inner welding portion 101a, 102a may be formed after the outer welding portion 101b, 102b is formed. For example, with respect to the first boundary Q1, the outer welding portion 101b may be formed by irradiating the laser beam L to the outer end part Q1b, and then the inner welding portion 101a may be formed by irradiating the laser beam L to the inner end part Q1a. Thereafter, with respect to the second boundary Q2, the inner welding portion 102a may be formed by irradiating the laser beam L to the inner end part Q2a, and then the outer welding portion 102b may be formed by irradiating the laser beam L to the outer end part Q2a. With this procedure, the inner welding portion 101a of the first welding portion 101 and the inner welding portion 102a of the second welding portion 102 can be continuously formed. Therefore, it is not required to substantially change the positional relationship between the laser device LA and the core unit 105. In this way, the work load at the time of manufacturing the core unit 105 can be reduced.

In each of the above embodiments, the second welding portion 102 is formed after the first welding portion 101 is formed. Alternatively, in a ninth modification, the first welding portion 101 may be formed after the second welding portion 102 is formed.

In each of the above embodiments, the movement of the movable structure M relative to the nozzle body 20 is guided at the three locations, i.e., the guide portions 30b, 31b and the slide member 33. In a tenth modification, the movement of the movable structure M relative to the nozzle body 20 may be guided only at two locations among the guide portions 30b, 31b and the slide member 33. For example, the movement of the movable structure M relative to the nozzle body 20 may be guided at two locations, i.e., the injection-hole-side guide portion 30b and the slide member 33. In this structure, the required accuracy of the coaxiality of the movable structure M relative to the nozzle body 20 can be easily ensured in comparison to the structure, in which the number of the guide locations is three. Therefore, it is possible to limit an increase in the friction of the movable structure M relative to the nozzle body 20 at the time of moving the movable structure M.

In each of the above embodiments, the movable structure M includes the movable member 35 and the urging resilient member SP2. In an eleventh modification, the movable structure M may not include the movable member 35 and the resilient urging member SP2. Even in this structure, the restricting flow passage F22 is formed by the orifice 32a at the movable flow passage F20, so that a pressure difference is generated between the upstream fuel pressure PH and the downstream fuel pressure PL. Therefore, at the time of moving the movable structure M in the valve closing direction, the cover upper chamber S1 implements the damper function and thereby exerts the brake force against the movable structure M.

Figure 12:
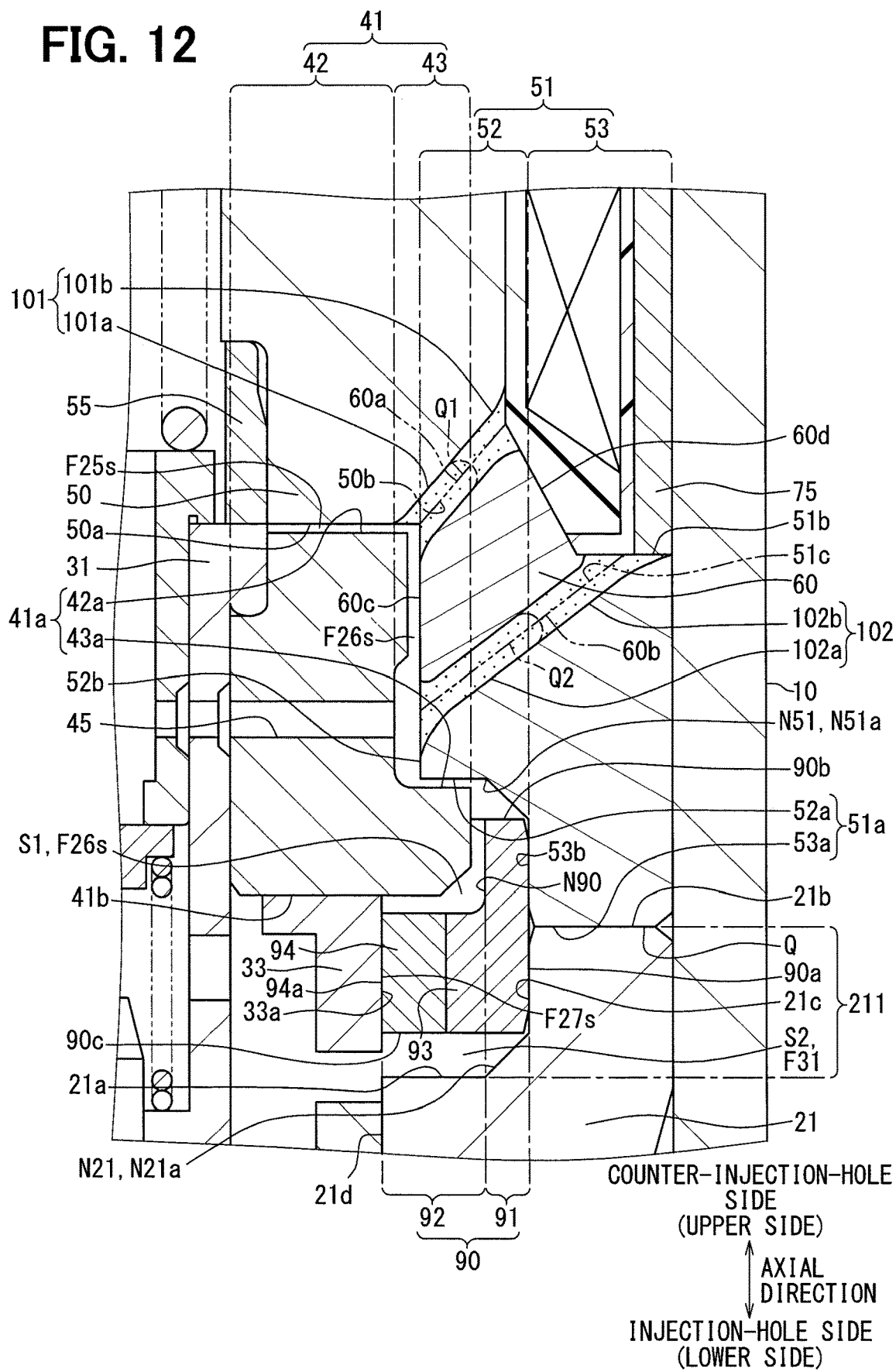
FIG. 12 is an enlarged view showing an area around a cover body in a twelfth modification.

In each of the above embodiments, the portion of the stopper 55, which projects from the first stationary core 50 toward the injection-hole side, forms the projection that ensures the gap between the stationary core 50, 51 and the movable core 41. In a twelfth modification, the projection may be formed at the movable structure M. For example, as shown in FIG. 12, at the movable structure M, a portion of the coupling member 31 projects from the movable core 41 toward the counter-injection-hole side, and this projecting portion of the coupling member 31 forms the projection. In this structure, the stopper 55 does not project from the first stationary core 50 toward the injection-hole side. Therefore, when the movement of the movable structure M is limited through the contact of the coupling member 31 against the stopper 55, the gap, which corresponds to the length of the projection of the coupling member 31 from the movable core 41, is ensured between the stationary core 50, 51 and the movable core 41.

In a thirteenth modification, a size of the gap between the first attractive surface and the stationary core may be set to be the same as or different from a size of the gap between the second attractive surface and the stationary core in each of the above embodiments. In the case where the sizes of these gaps are different from each other, it is desirable that one of the first attractive surface and the second attractive surface, which conducts the smaller amount of magnetic flux in comparison to the other one of the first attractive surface and the second attractive surface, has the larger size of the gap in comparison to the gap of the other one of the first attractive surface and the second attractive surface. This reason will be described below.

In a state where the fuel is filled in a form of thin film between the stationary core and the attractive surface, the attractive surface is not easily pulled off from the stationary core due to presence of linking. The strength of the linking is increased as the size of the gap between the stationary core and the attractive surface is reduced. Thereby, the responsiveness for starting of the valve closing movement relative to the turning off of the energization is deteriorated. However, when the size of the gap is increased to reduce the strength of the linking, the attractive force is reduced as a tradeoff. With respect to this point, even when the size of the gap is reduced at the attractive surface, which conducts the smaller amount of magnetic flux in comparison to the other attractive surface, the reduction in the size of the gap does not largely contribute to an increase in the attractive force. Therefore, it is more effective to reduce the strength of the linking by increasing the size of the gap.

Therefore, it is desirable to increase the size of the gap at the one of the first attractive surface and the second attractive surface, which conducts the smaller amount of magnetic flux in comparison to the other one of the first attractive surface and the second attractive surface. In each of the above embodiments, the amount of magnetic flux, which passes through the attractive surface (the second attractive surface) located on the radially outer side is smaller than the amount of magnetic flux, which passes through the attractive surface (the first attractive surface) located on the radially inner side. Therefore, the size of the gap at the second attractive surface is set to be larger than the size of the gap at the first attractive surface.

Although the present disclosure has been described in view of the above embodiments, it should be understood that the present disclosure is not limited to the above embodiments and structures. The present disclosure also includes various modifications and variations within the equivalent range. In addition, various combinations and forms, and also other combinations and forms, each of which includes only one element or more or less, are within the scope of the present disclosure.

What is claimed is:

1. A fuel injection valve configured to inject fuel from an injection hole, comprising:
   a coil that is configured to generate a magnetic flux when the coil is energized;
   a stationary core that is configured to become a passage of the magnetic flux;
   a movable core that is configured to be attracted to the stationary core when the movable core becomes a passage of the magnetic flux; and
   a magnetic-flux limiting portion that is displaced from the stationary core in an axial direction of a central axis of the stationary core while the magnetic-flux limiting portion is a metal member that has a degree of magnetism, which is lower than a degree of magnetism of the stationary core, wherein:
   an entire boundary between the stationary core and the magnetic-flux limiting portion is defined as a limiting boundary, and an imaginary extension line, which is formed by extending the limiting boundary toward the movable core, is defined as a boundary extension line;
   the limiting boundary linearly extends throughout an entire extent of the limiting boundary; and
   the limiting boundary is tilted relative to the axial direction of the central axis such that the boundary extension line is progressively spaced away from the central axis in a direction away from the injection hole.

2. The fuel injection valve according to claim 1, comprising a welding portion, at which the stationary core and the magnetic-flux limiting portion are integrally welded together along the limiting boundary, wherein the welding portion includes:
   an inner welding portion that extends from an inner end part of the limiting boundary toward an outer end part of the limiting boundary; and
   an outer welding portion that extends from the outer end part of the limiting boundary toward the inner end part of the limiting boundary.

3. The fuel injection valve according to claim 2, wherein the inner welding portion and the outer welding portion are joined together at an intermediate location of the limiting boundary.

4. The fuel injection valve according to claim 1, wherein:
   the stationary core is one of a plurality of stationary cores that include a first stationary core and a second stationary core, wherein the second stationary core is placed on an injection hole side of the first stationary core where the injection hole is located;
   the magnetic-flux limiting portion is placed between the first stationary core and the second stationary core in an axial direction of the coil;
   the limiting boundary is one of a plurality of limiting boundaries while a boundary between the first stationary core and the magnetic-flux limiting portion is defined as a first boundary that is one of the plurality of limiting boundaries, and a boundary between the second stationary core and the magnetic-flux limiting portion is defined as a second boundary that is another one of the plurality of limiting boundaries;
   the boundary extension line is one of a plurality of boundary extension lines while an imaginary extension line, which is formed by extending the first boundary toward a radially inner side of the coil, is defined as a first extension line that is one of the plurality of boundary extension lines, and an imaginary extension line, which is formed by extending the second boundary toward the radially inner side of the coil, is defined as a second extension line that is another one of the plurality of boundary extension lines; and at least one of the first extension line and the second extension line is tilted relative to a coil axis, which is an axis of the coil, such that the at least one of the first extension line and the second extension line passes on the injection hole side of all of an opposite portion of the stationary core and an opposite portion of the magnetic-flux limiting portion, which are diametrically opposite to the first boundary and the second boundary about the movable core.

5. The fuel injection valve according to claim 4, wherein a tilt angle of the first boundary relative to the coil axis is smaller than a tilt angle of the second boundary relative to the coil axis.

6. The fuel injection valve according to claim 4, wherein the first extension line and the coil axis intersect with each other at a first axis intersection point while the second extension line and the coil axis intersect with each other at a second axis intersection point, and the first axis intersection point is placed on a side of the second axis intersection point that is opposite to the injection hole.

7. The fuel injection valve according to claim 4, wherein:
one of an outer peripheral surface of the first stationary core and an outer peripheral surface of the second stationary core is placed on a radially outer side of the other one of the outer peripheral surface of the first stationary core and the outer peripheral surface of the second stationary core, while an imaginary extension line, which is formed by extending the one of the outer peripheral surface of the first stationary core and the outer peripheral surface of the second stationary core toward the injection hole, is defined as an outer surface extension line; and
the outer surface extension line and the first extension line intersect with each other at a first outer intersection point while the outer surface extension line and the second extension line intersect with each other at a second outer intersection point, and the first outer intersection point is placed on the injection hole side of the second outer intersection point where the injection hole is located.

8. The fuel injection valve according to claim 4, wherein:
each one of the first extension line and the second extension line is tilted relative to a coil axis, which is an axis of the coil, such that each one of the first extension line and the second extension line passes on the injection hole side of all of an opposite portion of the stationary core and an opposite portion of the magnetic-flux limiting portion, which are diametrically opposite to the first boundary and the second boundary about the movable core.

9. The fuel injection valve according to claim 4, wherein:
a length of the second boundary as measured in an extending direction of the second extension line is larger than a length of the first boundary as measured in the extending direction of the first extension line.

10. A method for manufacturing the fuel injection valve of claim 1, comprising:
applying heat to the limiting boundary from each of a radially outer side and a radially inner side of the limiting boundary to weld the stationary core and the magnetic-flux limiting portion together.

11. The method according to claim 10, comprising forming an attractive surface of the stationary core to be attracted to the movable core, which is configured to become the passage of the magnetic flux, by removing an opposed portion of the stationary core, which is opposed to the movable core, after the welding of the stationary core and the magnetic-flux limiting portion.

12. The method according to claim 10, comprising forming a flow passage surface that forms a portion of a flow passage, which is configured to conduct the fuel to the injection hole, by removing an opposed portion of the magnetic-flux limiting portion, which is opposed to the movable core, after the welding of the stationary core and the magnetic-flux limiting portion.

* * * * *